(12) United States Patent
Biswas et al.

(10) Patent No.: US 11,832,119 B2
(45) Date of Patent: Nov. 28, 2023

(54) IDENTIFICATION OF ANOMALOUS TELECOMMUNICATION SERVICE

(71) Applicant: Verizon Patent and Licensing Inc., Basking Ridge, NJ (US)

(72) Inventors: Subham Biswas, Maharashtra (IN); Bharatwaaj Shankar, Chennai (IN); Sudhakar X. Lanka, Hyderabad (IN); Eswara P. Somarouthu, Plano, TX (US); Keerthi Gudur, Thiruvallur (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 49 days.

(21) Appl. No.: 17/462,602

(22) Filed: Aug. 31, 2021

(65) Prior Publication Data

US 2023/0065889 A1  Mar. 2, 2023

(51) Int. Cl.

| | | |
|---|---|---|
| *H04W 24/08* | (2009.01) | |
| *H04W 24/10* | (2009.01) | |
| *H04W 28/02* | (2009.01) | |
| *G06N 20/00* | (2019.01) | |
| *H04W 64/00* | (2009.01) | |
| *H04W 4/24* | (2018.01) | |
| *H04W 12/06* | (2021.01) | |
| *H04W 72/51* | (2023.01) | |

(52) U.S. Cl.
CPC ........... *H04W 24/08* (2013.01); *G06N 20/00* (2019.01); *H04W 4/24* (2013.01); *H04W 12/06* (2013.01); *H04W 24/10* (2013.01); *H04W 28/0252* (2013.01); *H04W 64/003* (2013.01); *H04W 72/51* (2023.01)

(58) Field of Classification Search
CPC ....... H04W 24/08; H04W 24/10; H04W 4/24; H04W 64/003; H04W 72/51; H04W 12/06; H04W 28/0252; G06N 20/00
USPC .......................................................... 455/405
See application file for complete search history.

(56) References Cited

U.S. PATENT DOCUMENTS

| | | | | |
|---|---|---|---|---|
| 10,771,489 | B1 * | 9/2020 | Bisht | G06N 20/00 |
| 11,057,409 | B1 * | 7/2021 | Bisht | H04L 43/04 |
| 11,374,955 | B2 * | 6/2022 | Bisht | H04L 43/12 |
| 11,457,031 | B1 * | 9/2022 | Bisht | G06N 7/01 |
| 11,601,455 | B2 * | 3/2023 | Bisht | G06N 7/01 |

(Continued)

*Primary Examiner* — Mong-Thuy T Tran

(57) ABSTRACT

One or more computing devices, systems, and/or methods for identifying anomalous behavior of users are provided. In an example, users of a telecommunication service provider may be segmented into a plurality of user segments based upon telecommunication service metrics associated with the users. A machine learning model may be trained using telecommunication service information associated with users of the first user segment to generate a trained machine learning model. Using the trained machine learning model, a forecast of telecommunication service usage associated with a first user segment of the plurality of user segments. A telecommunication service usage metric, associated with a user belonging to the first user segment, may be compared with a range indicated by the forecast. The user may be flagged as having anomalous behavior based upon a determination that one or more telecommunication usage metrics, associated with the user, are outside one or more ranges indicated by the forecast.

20 Claims, 13 Drawing Sheets

(56) References Cited

U.S. PATENT DOCUMENTS

| | | | |
|---|---|---|---|
| 2014/0242943 A1* | 8/2014 | Mohammed | H04M 15/8016 455/406 |
| 2015/0341504 A1* | 11/2015 | Yang | H04M 15/60 455/407 |
| 2016/0092774 A1* | 3/2016 | Wang | H04L 67/535 706/46 |
| 2018/0165590 A1* | 6/2018 | Vlassis | G06N 5/045 |
| 2018/0288063 A1* | 10/2018 | Koottayi | G06F 21/50 |
| 2020/0012968 A1* | 1/2020 | Yu | G06F 21/552 |
| 2020/0137094 A1* | 4/2020 | Janakiraman | G06N 20/00 |
| 2022/0278914 A1* | 9/2022 | Du | H04L 43/0847 |

* cited by examiner

IDENTIFICATION OF ANOMALOUS TELECOMMUNICATION SERVICE

BACKGROUND

A telecommunication service provider may provide telecommunication services for users that are subscribed to a service plan with the telecommunication service provider. For example, a user equipment (UE) may be able to at least one of access the internet, place a telephone call, send and/or receive messages (e.g., text messages), etc. using the telecommunication services.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION OF EXAMPLE EMBODIMENTS

Figure 1A:
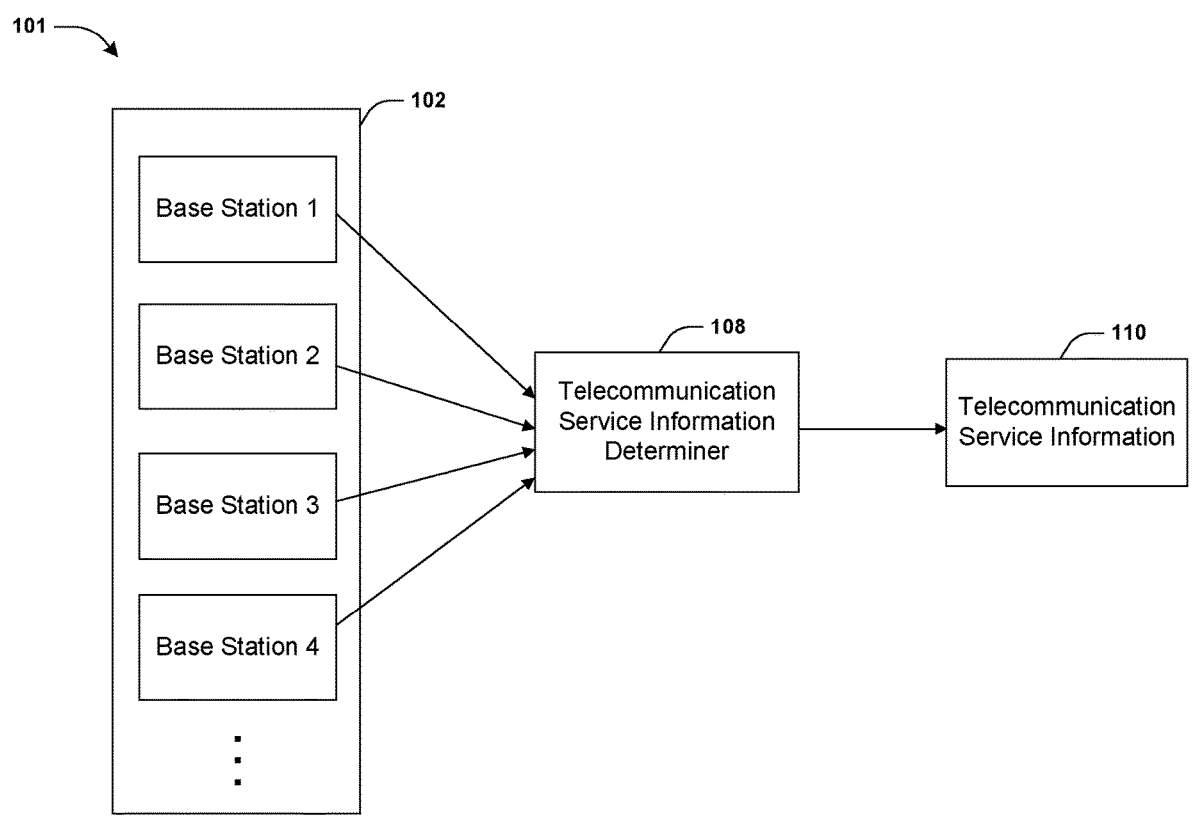
FIG. 1A is a diagram illustrating an example system for identifying anomalous behavior of users, where first telecommunication service information is determined according to some embodiments.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for identifying anomalous behavior of users are provided. Users may be provided with telecommunication services (e.g., at least one of cellular service, internet service, messaging service, etc.) by a telecommunication service provider. For example, a user equipment (UE) of a user may be able to at least one of access a network (e.g., a packet-switched network, such as an IP network and/or the Internet), place a telephone call, send and/or receive messages (e.g., text messages), etc. using the telecommunication services. Identification of anomalous behavior of users using telecommunication services provided by the telecommunication service provider may be beneficial for at least one of mitigating (e.g., preventing) revenue leakage, detecting fraudulent activity, etc.

Accordingly, as provided herein, telecommunication service metrics associated with users of the telecommunication service provider may be determined. The users may be segmented into user segments based upon the telecommunication service metrics. A machine learning model may be trained using telecommunication service information associated with users of a first user segment of the user segments to generate a trained machine learning model for the first user segment. A forecast of telecommunication service usage associated with the first user segment may be determined. For example, the forecast may be determined using the trained machine learning model that is generated based upon the telecommunication service information. Alternatively and/or additionally, the forecast may be determined, based upon the telecommunication service information, using a set of rules. One or more service usage metrics associated with a user that belongs to the first user segment may be compared with the forecast to determine whether or not service usage of the user is anomalous. For example, the user may be flagged as having anomalous behavior based upon the comparison of the one or more service usage metrics with the forecast.

In some examples, based upon flagging the user as having anomalous behavior, it may be determined that a UE of the user is stolen and/or used by one or more other users. Accordingly, in response to flagging the user as having anomalous behavior (and/or in response to determining that the UE of the user is stolen and/or used by one or more other users), an authentication interface may be displayed via the UE to authenticate the user. Alternatively and/or additionally, one or more protective actions, such as locking the UE, may be performed if the user is not authenticated.

In some examples, based upon flagging the user as having anomalous behavior, it may be determined that the user is associated with fraudulent activity. Accordingly, in response to flagging the user as having anomalous behavior (and/or in response to determining that the user is associated with fraudulent activity), telecommunication service of one or more UEs associated with the user may be deactivated (to prevent further fraudulent activity, for example).

In some examples, insufficient-coverage locations may be determined based upon the user segments and/or based upon users that are flagged as having anomalous behavior. For example, one or more telecommunication resources may be allocated (e.g., deployed) to one or more determined insufficient-coverage locations.

In some examples, in response to flagging the user as having anomalous behavior, a compensation value (determined prior to flagging the user as having anomalous behavior, for example) may be checked to determine whether the compensation value is correct. For example, the compensation value may correspond to an amount of compensation for services provided by the telecommunication service provider for the user over a period of time, where the user may be provided with a bill indicating that the user owes the amount of compensation for the services over the period of time. If the compensation value is incorrect (e.g., if the user is over-billed or under-billed for the services over the period of time), a second compensation value associated with services over the period of time may be determined (e.g., the amount of compensation may be recalculated). If it is determined that the compensation value is incorrect (e.g., the compensation value is different than the second compensation value), the user may be provided with a second bill (e.g., a corrected bill) generated based upon the second compensation value. Accordingly, using one or more of the techniques herein, anomalous behavior may be detected and/or the amount of compensation may be checked and/or corrected (such that revenue leakage is prevented and/or the user is not over-billed or under-billed, for example) automatically with increased speed, with less cost and/or with less manual effort than other systems.

FIGS. 1A-1G illustrate examples of a system 101 for identifying anomalous behavior of users. A plurality of users may be provided with telecommunication services by a telecommunication service provider. For example, telecommunication services provided by the telecommunication service provider for a first user of the plurality of users may comprise at least one of cellular service (e.g., 5G service, 4G service and/or other type of cellular service), internet service (e.g., cellular internet service, cable internet, digital subscriber line (DSL) internet service, satellite internet service, 5G internet service, and/or other type of internet service), messaging service, etc. In an example, the first user may be associated with one or more first UEs (e.g., at least one of one or more phones, one or more laptops, one or more computers, one or more wearable devices, one or more smart devices, one or more televisions, any other type of computing device, hardware, etc.). The one or more first UEs may be able to at least one of access a network (e.g., a packet-switched network, such as an IP network and/or the Internet), place a telephone call, send and/or receive messages (e.g., text messages), etc. using the telecommunication services. For example, the first user may be subscribed to a telecommunication service plan with the telecommunication service provider, wherein the telecommunication service provider may receive compensation periodically (e.g., monthly) in accordance with the telecommunication service plan. The one or more first UEs may be included in the telecommunication service plan.

First telecommunication service information associated with the plurality of users of a telecommunication service provider may be determined. In an example, the first telecommunication service information may comprise a plurality of sets of telecommunication service information associated with the plurality of users. For example, a set of telecommunication service information of the plurality of sets of telecommunication service information (and/or each set of telecommunication service information of the plurality of sets of telecommunication service information) may be associated with a user of the plurality of users. In some examples, a set of telecommunication service information of the plurality of sets of telecommunication service information (and/or each set of telecommunication service information of the plurality of sets of telecommunication service information) may be indicative of telecommunication service usage associated with a user within a first period of time, such as within at least one of a day, a week, a month, etc. In an example, a first set of telecommunication service information of the plurality of sets of telecommunication service information may be associated with the first user. In some examples, the first set of telecommunication service information may be indicative of service usage of the one or more first UEs within the first period of time. For example, the first set of telecommunication service information may be indicative of at least one of one or more services of the telecommunication service provider used by the one or more first UEs during the first period of time, one or more times at which one or more services are provided to the one or more first UEs during the first period of time, an amount of internet usage (e.g., a number of megabytes) of the one or more first UEs using internet service provided by the telecommunication service provider during the first period of time, an amount of telephone usage (e.g., amount of time of one or more telephone calls) of the one or more first UEs using telecommunication service provided by the telecommunication service provider during the first period of time, etc. Alternatively and/or additionally, other sets of telecommunication service information of the plurality of sets of telecommunication service information may be determined based upon service usage of UEs within the first period of time, such as within the month.

FIG. 1A illustrates the first telecommunication service information (shown with reference number 110) being determined. In an example, the first telecommunication service information 110 may be determined using a telecommunication service information determiner 108. The first telecommunication service information 110 may be determined based upon information received from a plurality of base stations 102. For example, a base station of the plurality of base stations 102 may transmit information to the telecommunication service information determiner 108, wherein the information is indicative of service usage of a UE via the base station. For example, the information may be indicative of at least one of one or more services used by a UE of the one or more first UEs via the base station, one or more times at which one or more services are provided to the UE, an amount of internet usage of the UE using internet service provided by the base station, an amount of telephone usage (e.g., amount of time of one or more telephone calls) of the UE using telecommunication service provided by the base station, etc. In some examples, the first set of telecommunication service information may be determined based upon the information from the base station and/or other information from one or more other base stations of the plurality of base stations 102.

Figure 1B:
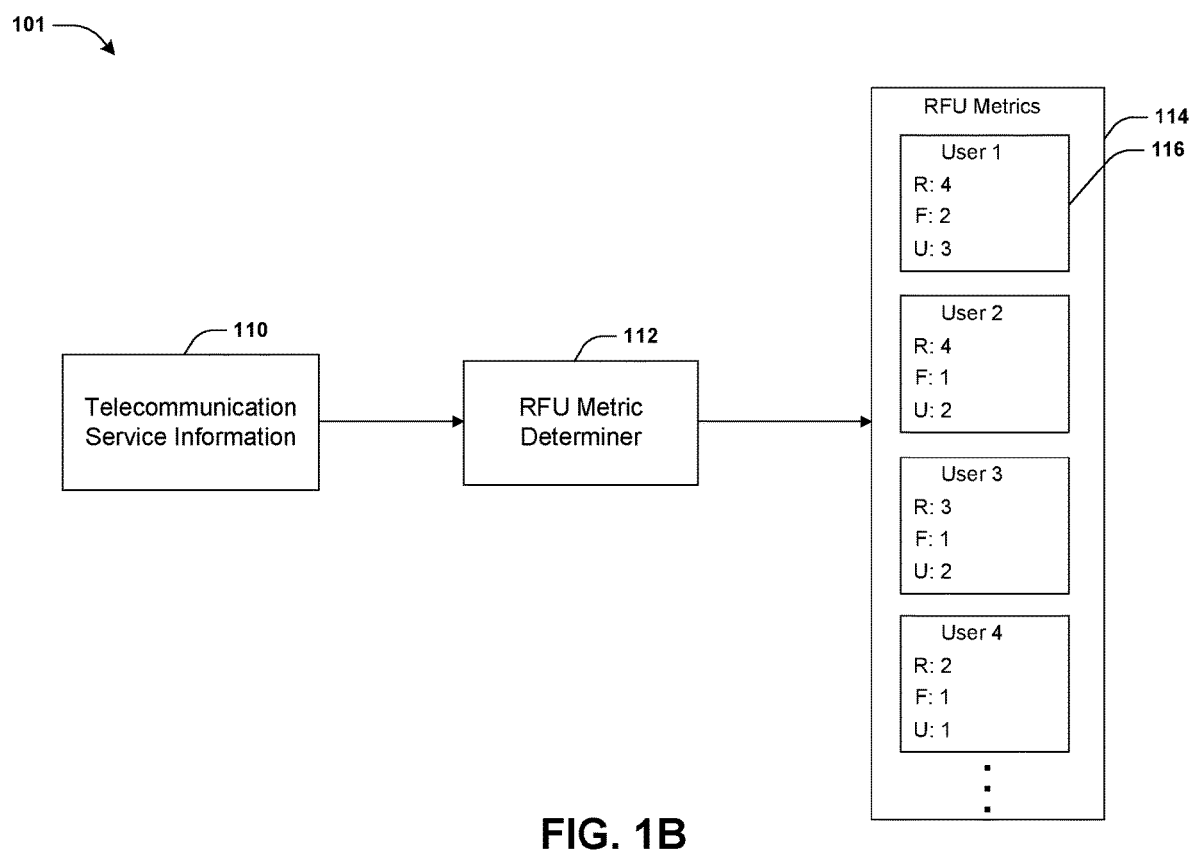
FIG. 1B is a diagram illustrating an example system for identifying anomalous behavior of users, where sets of telecommunication service metrics are determined according to some embodiments.
Figure 1C:
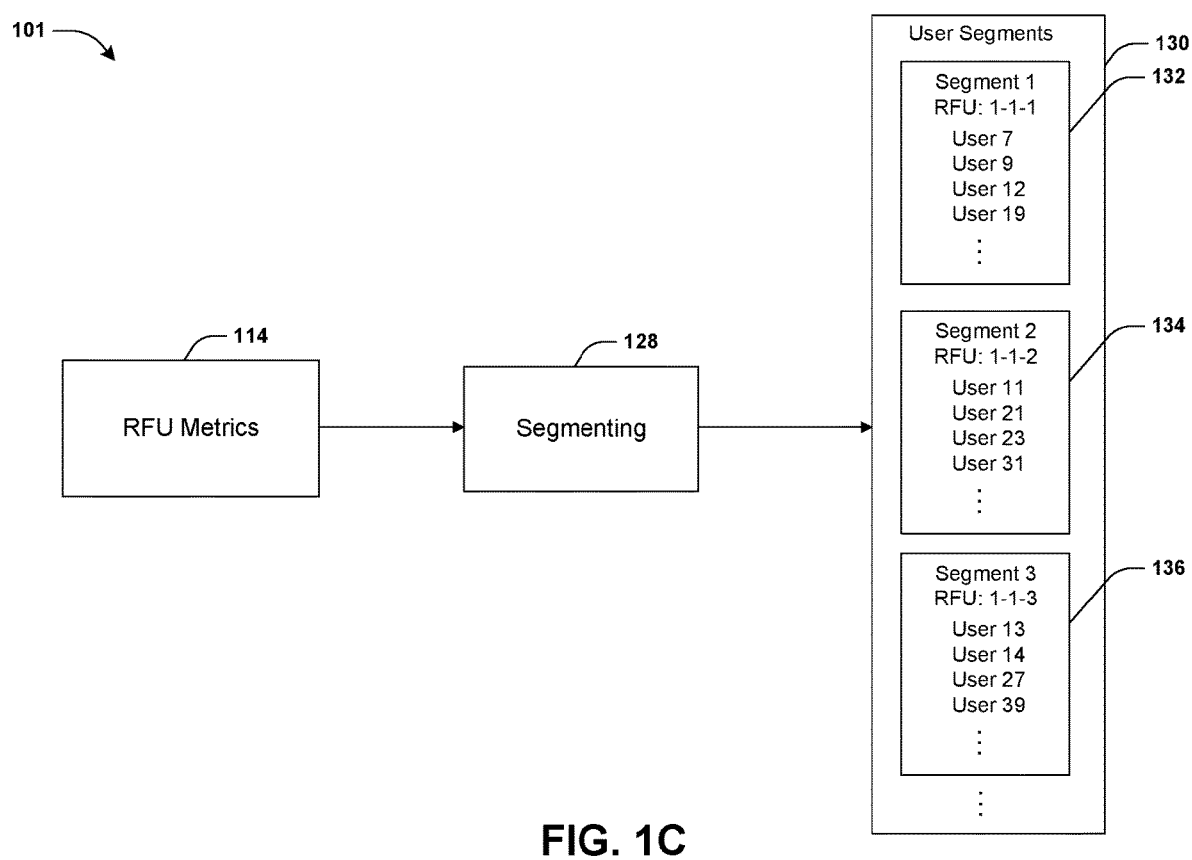
FIG. 1C is a diagram illustrating an example system for identifying anomalous behavior of users, where users are segmented into user segments according to some embodiments.
Figure 1D:
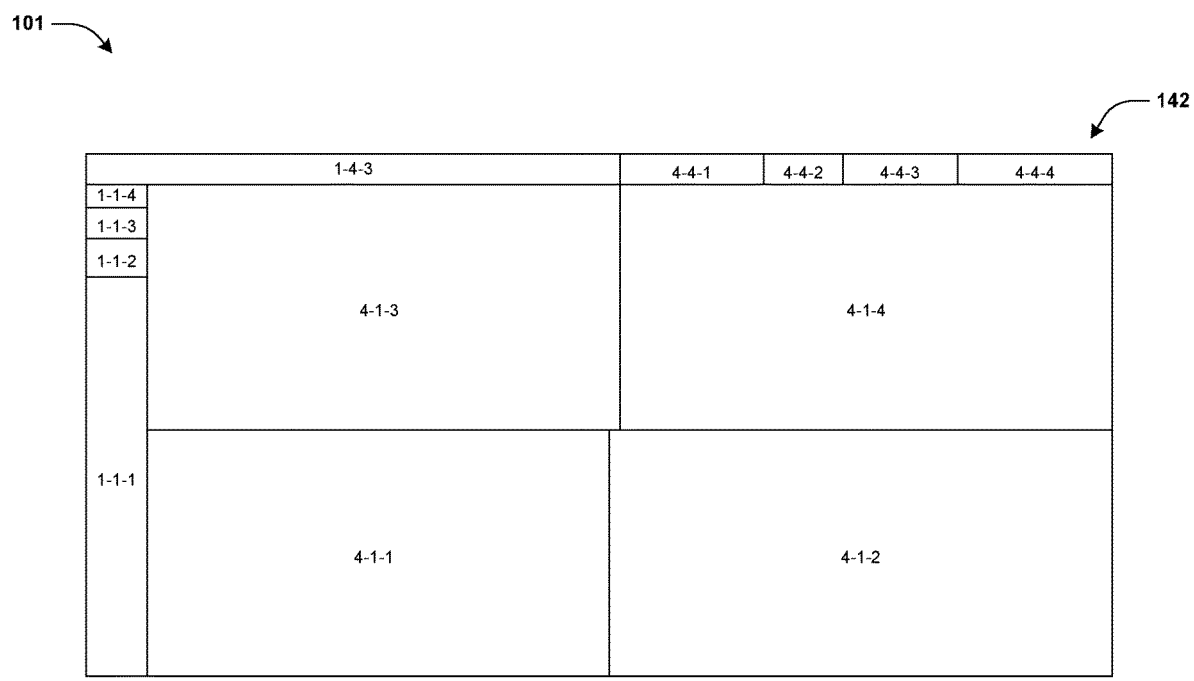
FIG. 1D is a diagram illustrating a plurality of user segments, of an example system for identifying anomalous behavior of users, according to some embodiments.
Figure 1E:
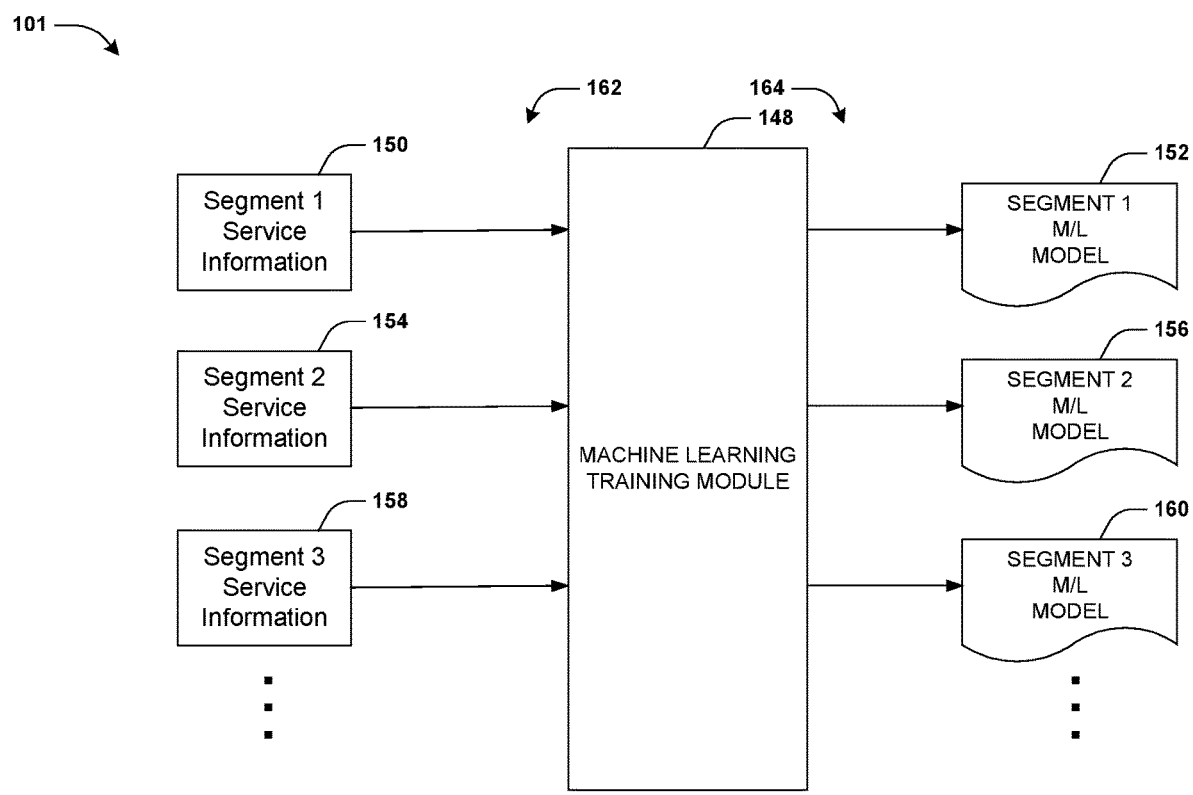
FIG. 1E is a diagram illustrating an example system for identifying anomalous behavior of users, where a training module trains machine learning models to generate trained machine learning models according to some embodiments.
Figure 1F:
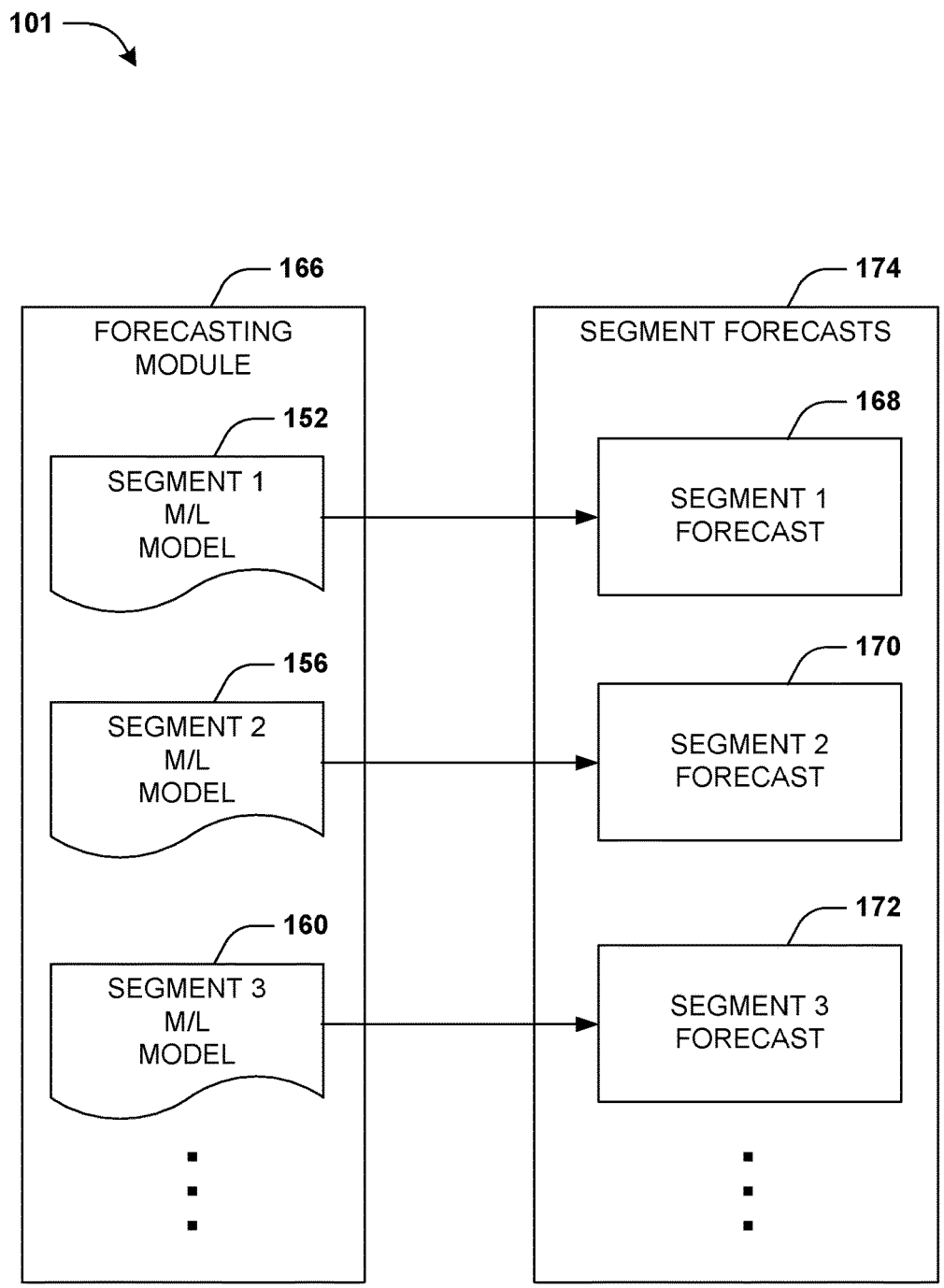
FIG. 1F is a diagram illustrating an example system for identifying anomalous behavior of users, where forecasts are determined using trained machine learning models according to some embodiments.
Figure 1G:
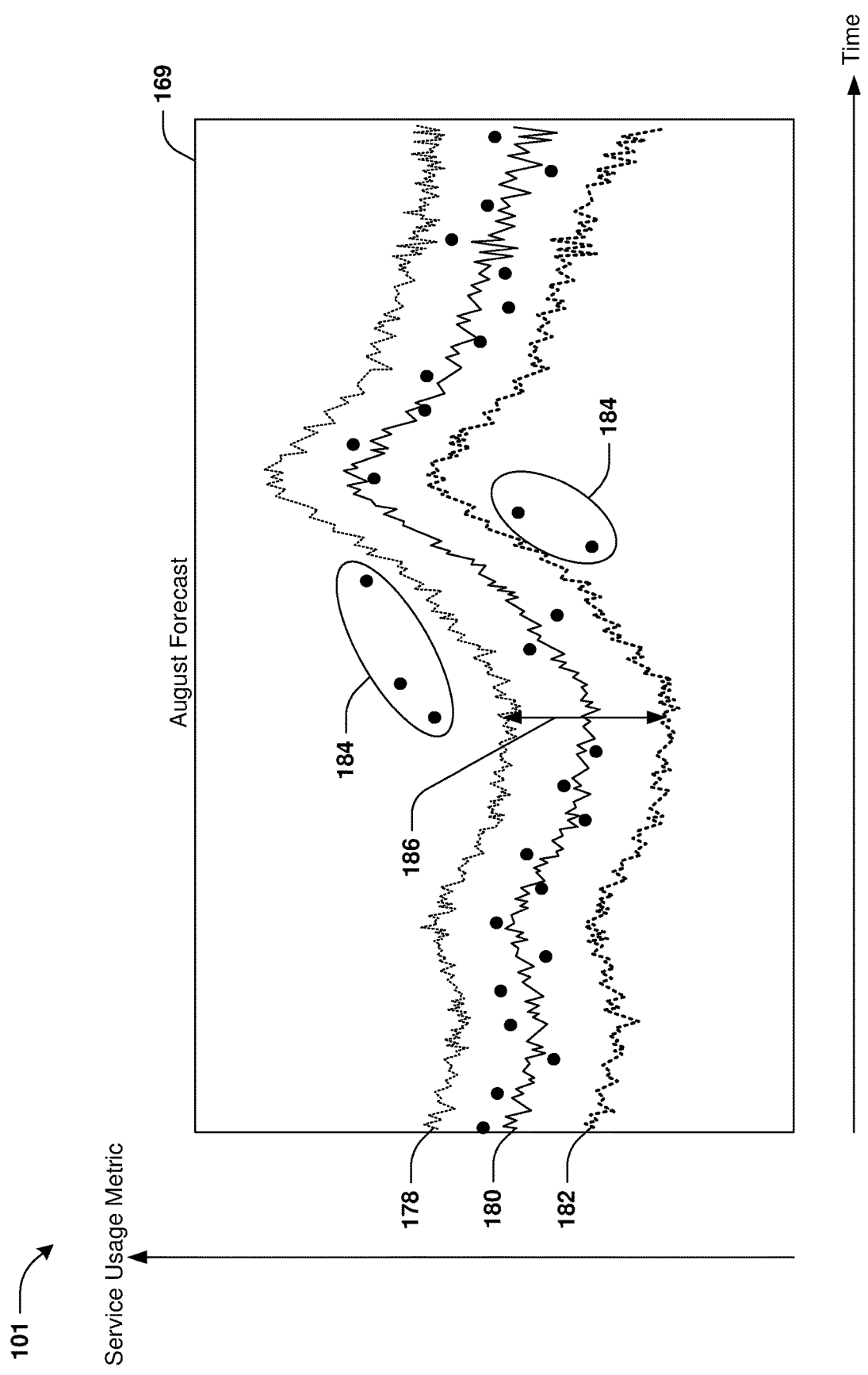
FIG. 1G is a diagram illustrating a chart representative of a first forecast, of an example system for identifying anomalous behavior of users, according to some embodiments.
Figure 2:
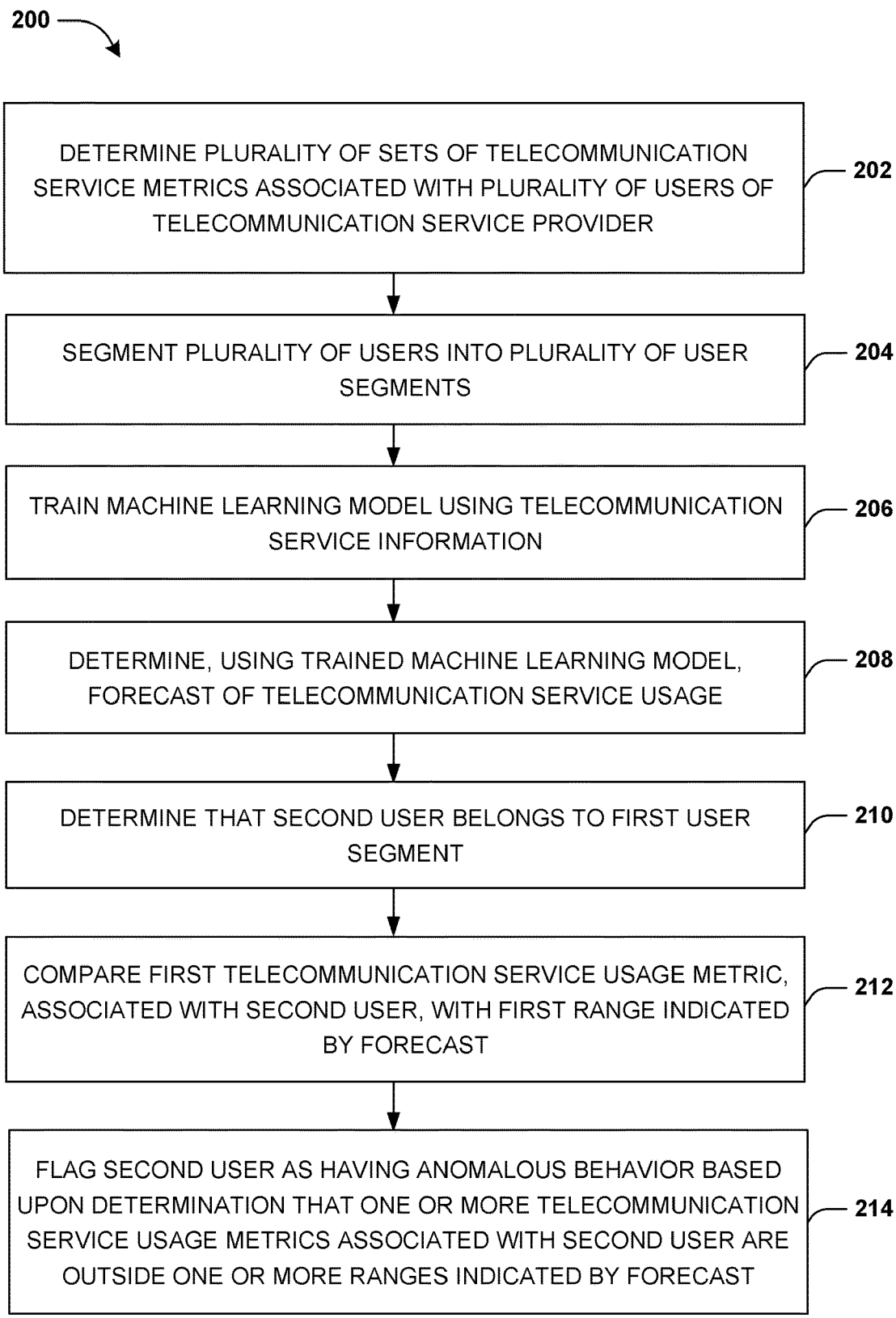
FIG. 2 is a flow chart illustrating an example method for identifying anomalous behavior of users according to some embodiments.

An embodiment of identifying anomalous behavior of users is illustrated by an exemplary method 200 of FIG. 2, and is further described in conjunction with the system 101 of FIGS. 1A-1G. At 202, a plurality of sets of telecommunication service metrics associated with the plurality of users may be determined. In some examples, the plurality of sets of telecommunication service metrics may be determined based upon the first telecommunication service information 110 (e.g., the plurality of sets of telecommunication service information). A set of telecommunication service metrics of the plurality of sets of telecommunication service metrics (and/or each set of telecommunication service metrics of the plurality of sets of telecommunication service metrics) is associated with a user of the plurality of users. In some examples, a set of telecommunication service metrics of the plurality of sets of telecommunication service metrics (and/or each set of telecommunication service metrics of the plurality of sets of telecommunication service metrics) may comprise one or more Recency-Frequency-Usage (RFU) metrics (e.g., one or more recency metrics, one or more frequency metrics and/or one or more usage metrics) associated with a user of the plurality of users.

For example, a first set of telecommunication service metrics of the plurality of sets of telecommunication service metrics may be associated with the first user. The first set of telecommunication service metrics may be determined based upon the first set of telecommunication service information. In an example, the first set of telecommunication service metrics may comprise a first recency metric associated with the first user, a first frequency metric associated with the first user and/or a first usage metric associated with the first user. In some examples, the first recency metric may be associated with (e.g., indicative of) recency of usage of telecommunication services by the first user (e.g., using the one or more first UEs). For example, the first recency metric may be indicative of a recency duration. For example, the recency duration may be a duration of time between a most recent usage of telecommunication service of the telecommunication service provider by a UE of the one or more first UEs (e.g., at least one of a most recent internet usage of telecommunication service of the telecommunication service provider, a most recent telephone usage of telecommunication service of the telecommunication service provider, etc.) and a time (e.g., a current time). Alternatively and/or additionally, the first frequency metric may be associated with (e.g., indicative of) a quantity of UEs of the one or more first UEs of the first user, such as a quantity of UEs that are included in the telecommunication service plan of the first user with the telecommunication service provider. Alternatively and/or additionally, the first usage metric may be associated with (e.g., indicative of) an amount of usage of telecommunication services by the first user. In an example, the first usage metric may be associated with (e.g., indicative of) at least one of an amount of internet usage of the one or more first UEs, an amount of telephone usage of the one or more first UEs, etc.

Alternatively and/or additionally, metrics of the plurality of sets of telecommunication service metrics may be indicative of ratings (e.g., scores). For example, recency metrics of the plurality of sets of telecommunication service metrics may be indicative of recency ratings (e.g., each set of telecommunication service metrics of the plurality of sets of telecommunication service metrics may comprise a recency metric indicative of a recency rating). In some examples, a recency rating of the plurality of sets of telecommunication service metrics (and/or each recency rating of recency ratings of the plurality of sets of telecommunication service metrics) may be a value (e.g., an integer value) of a recency rating scale comprising a first set of values (e.g., the first set of values may comprise values between a first minimum value and a first maximum value). In an example, the first set of values of the recency rating scale may comprise 1, 2, 3 and 4 (e.g., the first minimum value may be 1 and the first maximum value may be 4). In an example in which the first set of values of the recency rating scale comprises 1, 2, 3, and 4, 1 may represent a lowest recency rating and 4 may represent a highest recency rating. A higher recency rating may represent a more recent usage of telecommunication services of the telecommunication service provider than a lower recency rating. In some examples, recency ratings of the plurality of sets of telecommunication service metrics may be determined based upon recency durations (indicated by the plurality of sets of telecommunication service metrics, for example) associated with the plurality of users.

Alternatively and/or additionally, frequency metrics of the plurality of sets of telecommunication service metrics may be indicative of frequency ratings (e.g., each set of telecommunication service metrics of the plurality of sets of telecommunication service metrics may comprise a frequency metric indicative of a frequency rating). In some examples, a frequency rating of the plurality of sets of telecommunication service metrics (and/or each frequency rating of frequency ratings of the plurality of sets of telecommunication service metrics) may be a value (e.g., an integer value) of a frequency rating scale comprising a second set of values (e.g., the second set of values may comprise values between a second minimum value and a second maximum value). In some examples, the second set of values of the frequency rating scale may be the same as the first set of values of the recency rating scale. Alternatively and/or additionally, the second set of values of the frequency rating scale may be different than the first set of values of the recency rating scale. A higher frequency rating may represent a higher quantity of UEs (included in a telecommunication service plan of the telecommunication service provider, for example) than a lower frequency rating. In some examples, frequency ratings of the plurality of sets of telecommunication service metrics may be determined based upon quantities of UEs (indicated by the plurality of sets of telecommunication service metrics, for example) associated with the plurality of users.

Alternatively and/or additionally, usage metrics of the plurality of sets of telecommunication service metrics may be indicative of usage ratings (e.g., each set of telecommunication service metrics of the plurality of sets of telecommunication service metrics may comprise a usage metric indicative of a usage rating). In some examples, a usage rating of the plurality of sets of telecommunication service metrics (and/or each usage rating of usage ratings of the plurality of sets of telecommunication service metrics) may be a value (e.g., an integer value) of a usage rating scale comprising a third set of values (e.g., the third set of values may comprise values between a third minimum value and a third maximum value). In some examples, the third set of values of the usage rating scale may be the same as the first set of values of the recency rating scale and/or the second set of values of the frequency rating scale. Alternatively and/or additionally, the third set of values of the usage rating scale may be different than the first set of values of the recency rating scale and/or the second set of values of the frequency rating scale. A higher usage rating may represent a higher usage of telecommunication services of the telecommunication service provider than a lower usage rating. In some examples, usage ratings of the plurality of sets of telecommunication service metrics may be determined based upon amounts of usage of telecommunication services (indicated by the plurality of sets of telecommunication service metrics, for example) associated with the plurality of users.

FIG. 1B illustrates the plurality of sets of telecommunication service metrics (shown with reference number 114) being determined. In an example, the plurality of sets of telecommunication service metrics 114 may be determined using a RFU metric determiner 112. The plurality of sets of telecommunication service metrics 114 may be determined based upon the first telecommunication service information 110. In an example shown in FIG. 1B, the first set of telecommunication service metrics (shown with reference number 116) may comprise a first recency rating of 4, a first frequency rating of 2 and/or a first usage rating of 3.

At 204, the plurality of users may be segmented (e.g., clustered and/or grouped) into a plurality of user segments (e.g., user buckets, user clusters and/or user groups) based upon the plurality of sets of telecommunication service metrics 114. For example, the plurality of users may be segmented into the plurality of user segments based upon recency metrics (e.g., recency ratings), frequency metrics (e.g., frequency ratings) and/or usage metrics (e.g., usage ratings) of the plurality of sets of telecommunication service metrics 114.

FIG. 1C illustrates the plurality of users being segmented into the plurality of user segments (shown with reference number 130). In an example, the plurality of users may be segmented, based upon the plurality of sets of telecommunication service metrics 114, using a segmenting module 128. In some examples, the plurality of users may be segmented such that users with similar RFU metrics (e.g., similar RFU ratings) are included in the same user segment of the plurality of user segments 130. For example, the plurality of users may be segmented such that users that are associated with the same RFU ratings are included in the same user segment. In an example, a user segment of the plurality of user segments 130 (and/or each user segment of the plurality of user segments 130) may be associated with a RFU combination, wherein the RFU combination corresponds to a combination of one or more recency metrics (e.g., one or more recency ratings), one or more frequency metrics (e.g., one or more frequency ratings), and/or one or more usage metrics (e.g., one or more usage ratings).

In an example, an RFU combination of a user segment of the plurality of user segments 130 may comprise a recency metric range, a frequency metric range and/or a usage metric range. The first user may be included in the user segment if the first recency metric associated with the first user is within the recency metric range, the first frequency metric associated with the first user is within the frequency metric range and/or the first usage metric associated with the first user is within the usage metric range.

In an example, an RFU combination of a user segment of the plurality of user segments 130 may comprise one or more recency ratings, one or more frequency ratings and/or one or more usage ratings. The first user may be included in the user segment if the first recency rating associated with the first user matches a recency rating of the one or more recency ratings, the first frequency rating associated with the first user matches a frequency rating of the one or more frequency ratings and/or the first usage rating associated with the first user matches a usage rating of the one or more usage ratings.

In an example, each user segment of the plurality of user segments 130 is associated with an RFU combination that comprises one recency rating, one frequency ratings and/or one usage rating. Accordingly, a quantity of user segments of the plurality of user segments 130 may be based upon a quantity of values of the first set of values of the recency rating scale, a quantity of values of the second set of values of the frequency rating scale and/or a quantity of values of the third set of values of the usage rating scale. In an example in which each rating scale of the recency rating scale, the frequency rating scale and the usage rating scale is a set of 4 values (e.g., 1, 2, 3, and 4), the quantity of user segments of the plurality of user segments 130 may be 64. In an example, the first user may be included in a user segment associated with an RFU combination of 4-2-3 (e.g., recency rating of 4, frequency rating of 2 and/or usage rating of 3) based upon the first recency rating being 4, the first frequency rating being 2 and/or the first usage rating being 3.

In an example shown in FIG. 1C, the plurality of user segments 130 may comprise a first user segment 132 associated with an RFU combination of 1-1-1 (e.g., recency rating of 1, frequency rating of 1 and/or usage rating of 1), a second user segment 134 associated with an RFU combination of 1-1-2 (e.g., recency rating of 1, frequency rating of 1 and/or usage rating of 2), a third user segment 136 associated with an RFU combination of 1-1-3 (e.g., recency rating of 1, frequency rating of 1 and/or usage rating of 3), etc.

FIG. 1D illustrates a diagram 142 of the plurality of user segments 130. In some examples, each box of the diagram 142 is associated with a user segment of the plurality of user segments 130, where a size of the box is representative of a quantity of users in the user segment. For example, a box associated with a user segment associated with an RFU combination of 4-1-3 being larger than a box associated with a user segment associated with an RFU combination of 1-1-4 may be representative of more users being included in the user segment associated with the RFU combination of 4-1-3 than in the user segment associated with the RFU combination of 1-1-4.

At 206, a first machine learning model may be trained using telecommunication service information associated with users of the first user segment 150 to generate a first trained machine learning model (associated with the first user segment 150). For example, for each user segment of some and/or all user segments of the plurality of user segments 130, a machine learning model may be trained using telecommunication service information associated with users of the user segment to generate a trained machine learning model. Accordingly, a plurality of trained machine learning models, associated with the plurality of user segments 130, may be generated. A trained machine learning model of the plurality of trained machine learning models (and/or each trained machine learning model of the plurality of trained machine learning models) may be associated with a user segment of the plurality of user segments 130 (e.g., the trained machine learning model may be generated based upon telecommunication service information associated with the user segment).

FIG. 1E illustrates a training module 148 training machine learning models to generate the plurality of trained machine learning models (shown with reference number 164). In an example, a plurality of sets of segment-related telecommunication service information 162 may be input to the training module 148. The training module 148 may generate the plurality of trained machine learning models 164 using the plurality of sets of segment-related telecommunication service information 162.

In an example, a trained machine learning model of the plurality of trained machine learning models 164 may be based upon a set of segment-related telecommunication service information of the plurality of segment-related telecommunication service information 162. For example, the first trained machine learning model (shown with reference number 152) may be trained using a first set of segment-related telecommunication service information 150 associated with the first user segment 132, a second trained machine learning model 156 may be trained using a second set of segment-related telecommunication service information 154 associated with the second user segment 134, a third trained machine learning model 160 may be trained using a third set of segment-related telecommunication service information 158 associated with the third user segment 136, etc.

In some examples, a set of segment-related telecommunication service information of the plurality of segment-related telecommunication service information may be based upon sets of telecommunication service information, of the plurality of sets of telecommunication service information, associated with users of a user segment of the plurality of user segments 130. In an example, the first user segment 132 may comprise User 7, User 9, User 12 and User 19. In the example, the first set of segment-related telecommunication service information 150 may be based upon a second plurality of sets of telecommunication service information, of the plurality of sets of telecommunication service information, associated with User 7, User 9, User 12 and User 19 (e.g., the second plurality of sets of telecommunication service information may comprise a set of telecommunication service information associated with User 7, a set of telecommunication service information associated with User 9, a set of telecommunication service information associated with User 12 and a set of telecommunication service information associated with User 19). Alternatively and/or additionally, the second plurality of sets of telecommunication service information may be modified to generate the first set of segment-related telecommunication service information 150. In an example (such as where the first period of time corresponds to a week or a month), the second plurality of sets of telecommunication service information (which may be representative of telecommunication service usage on a monthly or weekly level, for example) may be converted (e.g., aggregated) to daily telecommunication service information (e.g., telecommunication service information representative of telecommunication service usage on a daily level), wherein the first set of segment-related telecommunication service information 150 may comprise the daily telecommunication service information (e.g., the daily telecommunication service information may be indicative of telecommunication service information for each day of the first period of time, such as first information associated with a first day of the first period of time, second information associated with a second day of the first period of time, etc.).

In some examples, the plurality of trained machine learning models 164 may be modified (e.g., updated). For example, acts 202 and/or 204 of exemplary method 200 may be repeated one or more times to determine updated sets of segment-related telecommunication service information, wherein the plurality of trained machine learning models 164 may be updated (e.g., further trained) using the updated sets of segment-related telecommunication service information. In some examples, the plurality of trained machine learning models 164 may be trained and/or updated (using one or more of the techniques provided herein, for example) based upon telecommunication service information associated with service usage of users over a second period of time (e.g., at least one of one or more months, one or more years, etc.).

At 208, a first forecast of telecommunication service usage associated with the first user segment 150 may be determined using the first trained machine learning model 152. For example, for each user segment of some and/or all user segments of the plurality of user segments 130, a forecast of telecommunication service usage associated with the user segment may be generated using a trained machine learning model, of the plurality of trained machine learning models 164, associated with the user segment. Accordingly, a plurality of forecasts of telecommunication service usage, associated with the plurality of user segments 130, may be determined. A forecast of the plurality of forecasts (and/or each forecast of the plurality of forecasts) may be associated with a user segment of the plurality of user segments 130 (e.g., the forecast may be determined using a trained machine learning model that is generated based upon telecommunication service information associated with the user segment).

FIG. 1F illustrates the plurality of forecasts (shown with reference number 174) being determined using the plurality of trained machine learning models 164. In an example, the plurality of trained machine learning models 164 may be loaded into a forecasting module 166. In some examples, a trained machine learning model of the plurality of trained machine learning models 164 (and/or each trained machine learning model of the plurality of trained machine learning models 164) may comprise at least one of a time series model (e.g., at least one of a univariate time series model, a Prophet model, etc.), an isolation forest model, a one-class support vector machine (SVM) model, an outlier and/or anomaly detection model, a forecasting model, a neural network model, a neural network-based time series model (e.g., NeuralProphet model), etc.

In some examples, the forecasting module 166 may use a trained machine learning model of the plurality of trained machine learning models 164 to determine a forecast of the plurality of forecasts 174. For example, the forecasting module 166 may use the first trained machine learning model 152 associated with the first user segment 132 to determine the first forecast (shown with reference number 168) associated with the first user segment 132, the forecasting module 166 may use the second trained machine learning model 156 associated with the second user segment 134 to determine a second forecast 170 associated with the second user segment 134, the forecasting module 166 may use the third trained machine learning model 160 associated with the third user segment 136 to determine a third forecast 172 associated with the third user segment 136, etc.

Embodiments are contemplated in which a forecast of the plurality of forecasts 174 (and/or each forecast of the plurality of forecasts 174) is determined using a set of rules (without using a machine learning model, for example). The forecast, associated with a user segment, may be generated based upon a set of segment-related telecommunication service information associated with the user segment (e.g., the set of rules may be applied to the set of segment-related telecommunication service information to determine the forecast). In some examples, the set of rules may comprise a formula. In some examples, the set of segment-related telecommunication service information may be analyzed to identify one or more service usage patterns (e.g., patterns of service usage of the user segment over time), wherein the forecast may be determined using the set of rules based upon the one or more service usage patterns. Alternatively and/or additionally, predicted metrics (e.g., predicted service usage) may be compared with actual metrics (e.g., actual service usage determined using the set of segment-related telecommunication service information) to determine errors (e.g., an error may correspond to a difference between a predicted metric and an actual metric), wherein the forecast may be determined based upon the errors. In an example, the forecast may be determined using AutoRegressive Integrated Moving Average (ARIMA), such as non-seasonal ARIMA and/or seasonal ARIMA (SARIMA).

In existing technologies, Recency-Frequency-Monetary (RFM) metrics are typically used for marketing analysis. For example, RFM does not lend itself to being combined with a machine learning model (e.g., Prophet model and/or NeuralProphet model) for generating telecommunication service usage forecasts. Rather, RFM metrics are typically used to identify spending nature of customers. Further, RFM metrics are typically used for marketing analysis (such as identifying spending nature of customers) and RFM metrics are not combined with a machine learning model (e.g., Prophet model and/or NeuralProphet model) to generate telecommunication service usage forecasts and/or identify anomalous telecommunication service usage behavior of users. With the novel techniques disclosed herein, RFM is modified and/or customized into RFU, thus enabling RFU metrics to be used in conjunction with a machine learning model (e.g., Prophet model and/or NeuralProphet model) that, using one or more of the techniques herein, is used to generate telecommunication service usage forecasts and/or identify anomalous behavior of users. In this way, by providing RFU metrics that are relevant to telecommunication service usage and utilizing the RFU metrics for user segmentation, beneficial aspects of RFM are leveraged to provide more accurate and efficient user segmentation of telecommunication service users into the plurality of user segments 130. Further, by utilizing the plurality of user segments 130, determined based upon the RFU metrics, to determine forecasts using machine learning models (e.g., Prophet models and/or NeuralProphet models) as provided herein, the plurality of forecasts 174 may be generated with increased accuracy (and/or with increased efficiency, such as compared to determining a forecast for each individual user, for example). Thus, the novel combination and/or integration of RFU with machine learning models (e.g., Prophet models and/or NeuralProphet models) may provide for increased accuracy in the identification of anomalous behavior and/or taking action to address the same.

According to some embodiments, a trained machine learning model of the plurality of trained machine learning models 164 (and/or each trained machine learning model of the plurality of trained machine learning models 164) may comprise a model that provides a forecast with minimum values and maximum values (e.g., minimum predicted service usage and maximum predicted service usage), such as a time series model (e.g., Prophet model) and/or a neural network-based time series model (e.g., NeuralProphet model). It may be appreciated that by using models that provide forecasts with minimum values and maximum values, the plurality of forecasts 174 may be generated to comprise ranges with which services usages of users can be compared to more accurately identify anomalous behavior.

In some examples, a forecast of the plurality of forecasts 174 (and/or each forecast of the plurality of forecasts 174) corresponds to a forecast (e.g., a prediction) of service usage of users belonging to a user segment associated with the forecast. For example, a forecast of the plurality of forecasts 174 (and/or each forecast of the plurality of forecasts 174) may be indicative of a plurality of ranges of a telecommunication service usage metric associated with a plurality of periods of time. For example, the first forecast 168 may be indicative of a first plurality of ranges of the telecommunication service usage metric associated with the plurality of periods of time. A range of the first plurality of ranges of the telecommunication service usage metric (and/or each range of the first plurality of ranges of the telecommunication service usage metric) may have an upper limit (e.g., a maximum value), a lower limit (e.g., a minimum value) or both an upper limit and a lower limit. In some examples, the telecommunication service usage metric may be a measure of at least one of internet usage, telephone usage, etc.

In some examples, a forecast (of the plurality of forecasts 174) associated with a user segment may be used to identify anomalous behavior of one or more users belonging to the user segment. For example, the first forecast 168 associated with the first user segment 132 may be used to identify anomalous behavior of one or more users belonging to the first user segment 132, the second forecast 170 associated with the second user segment 134 may be used to identify anomalous behavior of one or more users belonging to the second user segment 134, etc.

It may be appreciated that a forecast (of the plurality of forecasts 174) associated with a user segment may have increased accuracy as compared to forecasts determined using other systems, such as due to the forecast taking into account changes in service usage patterns and/or trends over time, such as changes in service usage patterns and/or trends associated with holidays, weekends and/or seasons. For example, by training (and/or updating) the plurality of trained machine learning models 164 using sets of segment-related telecommunication service information (e.g., telecommunication service information representative of telecommunication service usage on a daily level) over the second period of time, the plurality of forecasts 174 may be generated based upon changes in service usage patterns and/or trends over time, such as changes in service usage patterns and/or trends associated with holidays, weekends and/or seasons.

In some examples, a second user may be provided with telecommunication services (e.g., at least one of cellular service, internet service, messaging service, etc.) by the telecommunication service provider. For example, the second user may be associated with one or more second UEs. For example, the one or more second UEs may be able to at least one of access a network (e.g., a packet-switched network, such as an IP network and/or the Internet), place a telephone call, send and/or receive messages (e.g., text messages), etc. using the telecommunication services. For example, the second user may be subscribed to a second telecommunication service plan with the telecommunication service provider. The one or more second UEs may be included in the second telecommunication service plan.

At 210, the second user may be determined to belong to the first user segment 132. In some examples, the second user may be determined to belong to the first user segment 132 based upon a second set of telecommunication service metrics associated with the second user. The second set of telecommunication service metrics may be determined using one or more of the techniques provided herein (such as one or more of the techniques provided herein with respect to determining the first set of telecommunication service metrics 114). The second set of telecommunication metrics may comprise a second recency metric (indicative of a second recency rating, for example), a second frequency metric (indicative of a second frequency rating, for example) and/or a second usage metric (indicative of a second usage rating, for example). The second user may be determined to belong to the first user segment 132 (e.g., the second user may be included in the first user segment 132) based upon a determination that the second recency metric is within a recency metric range associated with the first user segment 132, the second frequency metric is within a frequency metric range associated with the first user segment 132 and/or the second usage metric is within a usage metric range associated with the first user segment 132. Alternatively and/or additionally, the second user may be determined to belong to the first user segment 132 (e.g., the second user may be included in the first user segment 132) based upon a determination that the second recency rating matches a recency rating associated with the first user segment 132, the second frequency rating matches a frequency rating associated with the first user segment 132 and/or the second usage rating matches a usage rating associated with the first user segment 132.

In some examples, one or more forecasts of the plurality of forecasts 174 may be used to determine whether service usage of the second user is anomalous. For example, based upon the determination that the second user belongs to the first user segment 132, the first forecast 168 associated with the first user segment 132 may be selected for use in determining whether service usage of the second user is anomalous.

At 212, one or more first telecommunication service usage metrics associated with the second user may be compared with one or more first ranges (of the first plurality of ranges, for example) indicated by the first forecast 168.

For example, a first telecommunication service usage metric of the one or more first telecommunication metrics may be compared with a first range of the one or more first ranges. The first range may be associated with a third period of time of the plurality of periods of time. The first telecommunication service usage metric may be determined based upon service usage of the second user during the third period of time. In an example, the first telecommunication service usage metric may correspond to an amount of internet usage of the second user (e.g., internet usage of the one or more second UEs using internet service provided by the telecommunication service provider) during the third period of time. Alternatively and/or additionally, the first range may be a range of amounts of internet usage, such as a range between a minimum amount of internet usage and a maximum amount of internet usage.

In an example in which the first range is a range of amounts of internet usage from 40 megabytes to 80 megabytes and the first telecommunication service usage metric is indicative of 75 megabytes, it may be determined that the first telecommunication service usage metric is within the first range. In an example in which the first range is a range of amounts of telephone usage from 10 minutes of call-time to 30 minutes of call-time and the first telecommunication service usage metric is indicative of 15 minutes of call-time, it may be determined that the first telecommunication service usage metric is within the first range.

In an example in which the first range is a range of amounts of internet usage from 40 megabytes to 80 megabytes and the first telecommunication service usage metric is indicative of 95 megabytes, it may be determined that the first telecommunication service usage metric is outside (e.g., over) the first range. In an example in which the first range is a range of amounts of telephone usage from 10 minutes of call-time to 30 minutes of call-time and the first telecommunication service usage metric is indicative of 5 minutes of call-time, it may be determined that the first telecommunication service usage metric is outside (e.g., under) the first range.

In some examples, the one or more first telecommunication service usage metrics may comprise a plurality of telecommunication service usage metrics associated with the second user. In an example, for each period of time of the plurality of periods of time, the plurality of telecommunication service usage metrics comprises a telecommunication service usage metric that is based upon telecommunication service usage of the second user during the period of time. In some examples, each telecommunication service usage metric of the plurality of telecommunication service usage metrics may be compared with a range, of the plurality of ranges, associated with the telecommunication service usage metric. A telecommunication service usage metric of the plurality of telecommunication service usage metrics may be associated with a range of the plurality of ranges if the telecommunication service usage metric and the range are associated with the same period of time of the plurality of periods of time (e.g., if the telecommunication service usage metric is based upon telecommunication service usage of the second user during the same period of time and the range corresponds to a predicted range for the same period of time).

In an example, the first forecast 168 may correspond to a forecast of a month and each period of time of the plurality of periods of time corresponds to a day of the month. Accordingly, a range of the plurality of ranges may correspond to a predicted range of a day of the month and/or a telecommunication service usage metric of the one or more first telecommunication service usage metrics may be based upon service usage of the second user during a day of the month. For example, the first telecommunication service usage metric may correspond to an amount of telecommunication service usage of the second user (e.g., internet usage of the one or more second UEs using internet service provided by the telecommunication service provider) during a first day. Alternatively and/or additionally, the first range may be a predicted range of amounts of telecommunication service usage of users of the first user segment during the first day. For example, telecommunication service usage of users of the first user segment may be predicted to be within the first range during the first day.

At 214, the second user may be flagged as having anomalous behavior based upon a determination that one or more second telecommunication service usage metrics associated with the second user are outside one or more second ranges of the plurality of ranges indicated by the first forecast 168. In some examples, anomalous behavior of the second user may correspond to anomalous service usage of the second user (e.g., anomalous usage of telecommunication services provided by the telecommunication service provider), such as service usage that is outside one or more ranges of the first forecast 168 predicted for users of the first user segment 132. The one or more second telecommunication service usage metrics are telecommunication service usage metrics of the one or more first telecommunication service usage metrics that are compared with the one or more first ranges of the plurality of ranges. Each telecommunication service usage metric of the one or more second telecommunication service usage metrics is outside a range, of the one or more second ranges, associated with the telecommunication service usage metric. That is, each telecommunication service usage metric of the one or more second telecommunication service usage metrics may be an outlier (e.g., an outlier of the first forecast 168).

FIG. 1G illustrates a chart 169 representative of the first forecast 168 (e.g., a forecast of the month of August). A horizontal axis of the chart 169 may correspond to time. A vertical axis of the chart 169 may correspond to a telecommunication service usage metric (e.g., a forecasted telecommunication service usage metric of the first forecast 168). The chart 169 comprises a minimum curve 182 illustrating a minimum forecasted telecommunication service usage metric throughout the plurality of periods of time, a maximum curve 178 illustrating a maximum forecasted telecommunication service usage metric throughout the plurality of periods of time, and/or a curve 180 illustrating an average forecasted telecommunication service usage metric throughout the plurality of periods of time. In an example, periods of time of the plurality of periods of time may correspond to at least one of minutes, hours, days, etc. (of the month of August, for example). A range 186 of the plurality of ranges may be between a value of the minimum curve 182 and a value of the maximum curve 178. As shown in the chart 169, the one or more second telecommunication service usage metrics (shown with reference number 184) are outliers (e.g., the one or more second telecommunication service usage metrics 184 are not between the minimum curve 182 and the maximum curve 178).

In some examples, the second user may be flagged as having anomalous behavior based upon a determination that the one or more second telecommunication service usage metrics 184 meet a threshold quantity of telecommunication service usage metrics. In an example in which the threshold quantity is 5 and a quantity of the one or more second telecommunication service usage metrics 184 is 4, the second user may not be flagged as having anomalous behavior. Alternatively and/or additionally, in an example in which the threshold quantity is 5 and a quantity of the one or more second telecommunication service usage metrics 184 is 5, the second user may be flagged as having anomalous behavior.

In some examples, it may be determined that a UE of the second user (e.g., a UE of the one or more second UEs) is stolen and/or used by one or more other users based upon flagging the second user as having anomalous behavior. For example, in response to flagging the second user as having anomalous behavior (and/or in response to determining that the UE of the second user is stolen and/or used by one or more other users), an authentication interface may be displayed via the UE. The authentication interface may comprise one or more selectable inputs and/or one or more fields for receiving one or more inputs comprising authentication information. For example, authentication information associated with the second user may be received via the authentication interface. In some examples, the authentication information may be compared with stored authentication information to authenticate the second user (e.g., verify that the second user is in possession of the UE). The second user may be authenticated (e.g., it may be verified that the second user is in possession of the UE) based upon a determination that the authentication information matches the stored authentication information. Alternatively and/or additionally, the second user may not be authenticated (e.g., it may not be verified that the second user is in possession of the UE) based upon a determination that the authentication information does not match the stored authentication information. In some examples, if the second user is not authenticated via the authentication interface (and/or in response to receiving authentication information that does not match the stored authentication information), one or more protective actions may be performed. For example, the one or more protective actions may comprise locking the UE such that the UE may not be used and/or information (e.g., personal information) on the UE cannot be accessed. Alternatively and/or additionally, the one or more protective actions may comprise transmitting information associated with the UE (e.g., a location of the UE, an indication that the UE may be stolen, etc.) to a different UE associated with the second user (e.g., a different UE of the one or more second UEs).

Accordingly, implementation of one or more of the techniques provided herein may lead to benefits including, but not limited to, at least one of automatic identification of anomalous behavior of a user, automatic determination that a UE of the user may be stolen and/or may not be in the user's possession, automatic authentication (to verify that the UE is in the user's possession, for example, automatic performance of one or more protective actions (e.g., locking the UE, which may prevent unauthorized access to information on the UE and/or may result in increased privacy of the user, etc.), etc. Alternatively and/or additionally, the automatic determination that the UE may be stolen and/or may not be in the user's possession, the automatic authentication and/or the automatic performance of the one or more protective actions may be performed with increased speed and/or may be performed with reduced manual effort (and/or no manual effort).

In some examples, the second user may be determined to be associated with fraudulent activity (and/or it may be determined that fraudulent activity is being performed by the second user and/or a UE of the one or more second UEs) based upon flagging the second user as having anomalous behavior. For example, the second user may be determined to be associated with fraudulent activity (and/or it may be determined that fraudulent activity is being performed by the second user and/or a UE of the one or more second UEs) based upon the second user being flagged as having anomalous behavior a threshold quantity of times (such as the second user being flagged as having anomalous behavior during a threshold quantity of months). Alternatively and/or additionally, the second user may be determined to be associated with fraudulent activity (and/or it may be determined that fraudulent activity is being performed by the second user and/or a UE of the one or more second UEs) based upon a determination that the one or more second telecommunication service usage metrics 184 meet a second threshold quantity of telecommunication service usage metrics (e.g., the second threshold quantity of telecommunication service usage metrics may be higher than the threshold quantity of telecommunication service usage metrics associated with identifying anomalous behavior). In some examples, in response to flagging the second user as having anomalous behavior (and/or in response to determining that the second user is associated with fraudulent activity), telecommunication service of one or more UEs associated with the second user (e.g., the one or more second UEs) may be deactivated. For example, the telecommunication service provider may not provide telecommunication services to the one or more UEs when telecommunication service of the one or more UEs is deactivated. In some examples, telecommunication service of the one or more UEs may be deactivated for a duration of time (e.g., at least one of one or more weeks, one or more months, etc.) in response to flagging the second user as having anomalous behavior (and/or in response to determining that the second user is associated with fraudulent activity). Alternatively and/or additionally, in response to flagging the second user as having anomalous behavior (and/or in response to determining that the second user is associated with fraudulent activity), the second telecommunication service plan associated with the second user may be canceled.

Accordingly, implementation of one or more of the techniques provided herein may lead to benefits including, but not limited to, at least one of automatic detection of fraudulent activity, automatic deactivation of telecommunication service of a UE associated with fraudulent activity (e.g., deactivating telecommunication service of the UE may result in preventing further fraudulent activity from being performed using the UE), etc. Alternatively and/or additionally, the automatic detection of fraudulent activity and/or the automatic deactivation of telecommunication service of the UE may be performed with increased speed and/or may be performed with reduced manual effort (and/or no manual effort).

In some examples, it may be determined that a bill and/or compensation value determined for the second user may be incorrect (and/or should be checked) based upon flagging the second user as having anomalous behavior. In some examples, in response to flagging the second user as having anomalous behavior, an alert may be transmitted to one or more devices (e.g., one or more administration devices associated with the telecommunication service provider) indicating that the second user is flagged as having anomalous behavior and/or that a bill and/or compensation value determined for the second user may be incorrect and/or should be checked. Alternatively and/or additionally, service usage information may be provided via an interface, such as an application programming interface (API) and/or a graphical user interface (GUI) to allow for information display. The service usage information may be indicative of the second user (and/or other users) being flagged as having anomalous behavior. In some examples, in response to flagging the second user as having anomalous behavior, a first compensation value (determined prior to flagging the second user as having anomalous behavior, for example) may be checked against a second compensation value (e.g., a compensation value determined in response to flagging the second user as having anomalous behavior) to determine whether the first compensation value is correct. In some examples, a first bill, indicative of the first compensation value, may be sent to the second user (prior to flagging the second user as having anomalous behavior, for example). For example, the first bill may be transmitted to a UE associated with the second user (e.g., a UE of the one or more second UEs). Alternatively and/or additionally, the first bill may be printed (e.g., automatically printed) and/or delivered (e.g., automatically delivered) to an address of the second user.

In some examples, the first compensation value and the second compensation value may each correspond to an amount of compensation for services provided by the telecommunication service provider for the second user over a third period of time. In an example, the third period of time may comprise the plurality of periods of time associated with the first forecast 168 (e.g., the third period of time may correspond to a month). The second compensation value may be determined in response to flagging the second user as having anomalous behavior. The first compensation value may be compared with the second compensation value to determine whether the second compensation value is different than the first compensation value. The first compensation value may be considered to be incorrect based upon a determination that the second compensation value is different than the first compensation value. Accordingly, in response to determining that the second compensation value is different than the first compensation value, a second (e.g., corrected) bill may be generated based upon the second compensation value. In some examples, the second bill may be transmitted to a UE associated with the second user (e.g., a UE of the one or more second UEs). Alternatively and/or additionally, the second bill may be printed (e.g., automatically printed) and/or delivered (e.g., automatically delivered) to the address of the second user.

In a scenario in which the first bill (indicative of the first compensation value) is sent to the second user prior to the second compensation value being determined (and/or prior to the second user being flagged as having anomalous behavior), the second bill may comprise an indication that the first bill should be disregarded. Alternatively and/or additionally, in a scenario in which the first bill is paid (by the second user, for example) prior to the second compensation value being determined and the second compensation value is lower than the first compensation value, a refund of an overpaid amount (e.g., a difference between the second compensation value and the first compensation value) may be transferred (e.g., automatically transferred) to an account associated with the second user. Alternatively and/or additionally, in a scenario in which the first bill is paid prior to the second compensation value being determined and the second compensation value is higher than the first compensation value, the second bill may be generated to comprise an indication of an amount of compensation that is due (e.g., a difference between the second compensation value and the first compensation value).

In some examples, the plurality of user segments 130 may be used for telecommunication resource allocation associated with the telecommunication service provider. For example, one or more first locations for telecommunication resource allocation may be determined based upon the plurality of user segments 130. In some examples, the one or more first locations may be one or more insufficient-coverage locations. In some examples, an insufficient-coverage location of the one or more insufficient-coverage locations may correspond to a location where a signal strength of coverage of telecommunication service of the telecommunication service provider is less than a threshold signal strength. Alternatively and/or additionally, an insufficient-coverage location of the one or more insufficient-coverage locations may correspond to a location with no coverage of telecommunication service of the telecommunication service provider. In some examples, a plurality of UE locations of UEs associated with users of the telecommunication service provider may be determined. The plurality of UE locations may be analyzed to identify a plurality of UEs that are within insufficient-coverage locations.

In some examples, the one or more first locations may be selected for telecommunication resource allocation from the insufficient-coverage locations based upon location prioritization scores of the insufficient-coverage locations. For example, the one or more first locations may be selected, for telecommunication resource allocation, from the insufficient-coverage locations based upon a determination that one or more location prioritization scores of the one or more first locations meet a threshold prioritization score. Alternatively and/or additionally, the one or more first locations may be selected, for telecommunication resource allocation, from the insufficient-coverage locations based upon a determination that the one or more location prioritization scores of the one or more first locations are the top N location prioritization scores of the location prioritization scores of the insufficient-coverage locations (e.g., N may be based upon an amount of telecommunication resources available to deploy).

In some examples, a location prioritization score of a low-coverage location may be determined based upon one or more user prioritization scores of one or more users associated with one or more UEs (of the plurality of UEs) that are within the low-coverage location. For example, the one or more user prioritization scores may be combined (e.g., summed) to determine the location prioritization score of the low-coverage location.

In some examples, a user prioritization score of a user may be based upon a user segment to which the user belongs, such as based upon a set of telecommunication service metrics associated with the user segment and/or based upon a quantity of users that belong to the user segment. In an example, a first user prioritization score of a third user may be higher than a second user prioritization score of a fourth user if a user segment to which the third user belongs is associated with a higher telecommunication service metric than a user segment to which the fourth user belongs. Alternatively and/or additionally, the first user prioritization score of the third user may be higher than the second user prioritization score of the fourth user if the user segment to which the third user belongs comprises a higher quantity of users than the user segment to which the fourth user belongs.

In some examples, telecommunication resource allocation may be performed and/or locations to which telecommunication resources are to be allocated may be determined based upon users flagged as having anomalous behavior (based upon the plurality of forecasts 174, for example). In an example, a location of the one or more first locations may be selected based upon a quantity of users, within the location, that are flagged as having a first type of anomalous behavior. For example, the location may be selected based upon a determination that the quantity of users exceeds a threshold quantity of users. The first type of anomalous behavior may correspond to service usage of a user being less than a predicted range associated with a user segment of the user. The location may be determined to be an insufficient-coverage location based upon the quantity of users exceeding the threshold quantity of users. In an example, the quantity of users exceeding the threshold quantity of users may be an indication that service quality in the location is lower than a threshold service quality (e.g., the low service quality inhibits users from using a desired level and/or amount of telecommunication service) and/or that the service quality in the location may be improved by allocating one or more telecommunication resources to the location.

In some examples, in response to selecting the one or more first locations for telecommunication resource allocation, one or more telecommunication resources may be allocated (e.g., deployed) to the one or more first locations. For example, instructions to allocate telecommunication resources to the one or more first locations may be transmitted to a telecommunication resource allocation device. In some examples, the one or more telecommunication resources may comprise at least one of telecommunication equipment, one or more base stations, one or more portable base stations, one or more in-vehicle base stations, etc. In some examples, the instructions may comprise an indication of the one or more first locations.

Accordingly, implementation of one or more of the techniques provided herein may lead to benefits including, but not limited to, at least one of automatic selection of one or more insufficient-coverage locations for telecommunication resource allocation based upon prioritization scores associated with insufficient-coverage locations, automatic deployment of telecommunication resources to the one or more insufficient-coverage locations, etc. Alternatively and/or additionally, the automatic selection of the one or more insufficient-coverage locations and/or the automatic deployment of telecommunication resources to the one or more insufficient-coverage locations may be performed with increased speed and/or may be performed with reduced manual effort (and/or no manual effort). Alternatively and/or additionally, by determining prioritization scores associated with insufficient-coverage locations based upon user segments of users within the insufficient-coverage locations, the one or more insufficient-coverage locations may be selected with increased accuracy.

In some examples, one, some and/or all of the operations provided herein may be performed by a telecommunication service system associated with the telecommunication service provider.

According to some embodiments, a method is provided. The method includes determining a plurality of sets of telecommunication service metrics associated with a plurality of users of a telecommunication service provider, wherein a first set of telecommunication service metrics of the plurality of sets of telecommunication service metrics is associated with a first user of the plurality of users; segmenting the plurality of users into a plurality of user segments based upon the plurality of sets of telecommunication service metrics, wherein a first user segment of the plurality of user segments includes the first user; training a machine learning model using telecommunication service information associated with users of the first user segment to generate a trained machine learning model; determining, using the trained machine learning model, a forecast of telecommunication service usage associated with the first user segment, wherein the forecast is indicative of ranges of a telecommunication service usage metric associated with a plurality of periods of time; determining that a second user belongs to the first user segment; comparing a first telecommunication service usage metric, associated with the second user, with a first range of the ranges indicated by the forecast, wherein the first range is associated with a first period of time of the plurality of periods of time and wherein the first telecommunication service usage metric is based upon telecommunication service usage of the second user during the first period of time; and flagging the second user as having anomalous behavior based upon a determination that one or more telecommunication service usage metrics associated with the second user, including the first telecommunication service usage metric, are outside one or more ranges, including the first range, of the ranges indicated by the forecast.

According to some embodiments, the method includes in response to flagging the second user as having anomalous behavior, presenting, via a UE associated with the second user, an authentication interface; receiving authentication information associated with the second user via the authentication interface; and authenticating the second user based upon the authentication information.

According to some embodiments, the method includes in response to flagging the second user as having anomalous behavior, deactivating telecommunication service of a UE associated with the second user.

According to some embodiments, the method includes in response to flagging the second user as having anomalous behavior, determining a first compensation value corresponding to an amount of compensation for services of the telecommunication service provider for the second user over a second period of time.

According to some embodiments, the method includes comparing the first compensation value with a second compensation value determined, in association with the second user, prior to flagging the second user as having anomalous behavior; in response to determining that the second compensation value is different than the first compensation value, generating a bill based upon the first compensation value; and transmitting the bill to a UE associated with the second user.

According to some embodiments, the method includes determining a plurality of UE locations of UEs associated with a second plurality of users of the telecommunication service provider; determining one or more locations based upon the plurality of UE locations and user segments, of the plurality of user segments, associated with the second plurality of users; and transmitting, to a telecommunication resource allocation device, instructions to allocate one or more telecommunication resources to the one or more locations.

According to some embodiments, the first set of telecommunication service metrics includes a recency metric associated with recency of usage of telecommunication services by the first user.

According to some embodiments, the first set of telecommunication service metrics includes a frequency metric associated with a quantity of UEs of the first user.

According to some embodiments, the first set of telecommunication service metrics includes a usage metric associated with an amount of usage of telecommunication services by the first user.

According to some embodiments, the first set of telecommunication service metrics includes a recency metric associated with recency of usage of telecommunication services by the first user; a frequency metric associated with a quantity of UEs of the first user; and a usage metric associated with an amount of usage of telecommunication services by the first user.

According to some embodiments, a non-transitory computer-readable medium, storing instructions that when executed perform operations, is provided. The operations include determining a plurality of sets of telecommunication service metrics associated with a plurality of users of a telecommunication service provider, wherein a first set of telecommunication service metrics of the plurality of sets of telecommunication service metrics is associated with a first user of the plurality of users; segmenting the plurality of users into a plurality of user segments based upon the plurality of sets of telecommunication service metrics, wherein a first user segment of the plurality of user segments includes the first user; training a machine learning model using telecommunication service information associated with users of the first user segment to generate a trained machine learning model; determining, using the trained machine learning model, a forecast of telecommunication service usage associated with the first user segment, wherein the forecast is indicative of ranges of a telecommunication service usage metric associated with a plurality of periods of time; determining that a second user belongs to the first user segment; comparing a first telecommunication service usage metric, associated with the second user, with a first range of the ranges indicated by the forecast, wherein the first range is associated with a first period of time of the plurality of periods of time and wherein the first telecommunication service usage metric is based upon telecommunication service usage of the second user during the first period of time; and flagging the second user as having anomalous behavior based upon a determination that one or more telecommunication service usage metrics associated with the second user, including the first telecommunication service usage metric, are outside one or more ranges, including the first range, of the ranges indicated by the forecast.

According to some embodiments, the operations include in response to flagging the second user as having anomalous behavior, presenting, via a UE associated with the second user, an authentication interface; receiving authentication information associated with the second user via the authentication interface; and authenticating the second user based upon the authentication information.

According to some embodiments, the operations include in response to flagging the second user as having anomalous behavior, deactivating telecommunication service of a UE associated with the second user.

According to some embodiments, the operations include in response to flagging the second user as having anomalous behavior, determining a first compensation value corresponding to an amount of compensation for services of the telecommunication service provider for the second user over a second period of time.

According to some embodiments, the operations include comparing the first compensation value with a second compensation value determined, in association with the second user, prior to flagging the second user as having anomalous behavior; in response to determining that the second compensation value is different than the first compensation value, generating a bill based upon the first compensation value; and transmitting the bill to a UE associated with the second user.

According to some embodiments, the operations include determining a plurality of UE locations of UEs associated with a second plurality of users of the telecommunication service provider; determining one or more locations based upon the plurality of UE locations and user segments, of the plurality of user segments, associated with the second plurality of users; and transmitting, to a telecommunication resource allocation device, instructions to allocate one or more telecommunication resources to the one or more locations.

According to some embodiments, the first set of telecommunication service metrics includes a recency metric associated with recency of usage of telecommunication services by the first user.

According to some embodiments, the first set of telecommunication service metrics includes a frequency metric associated with a quantity of UEs of the first user.

According to some embodiments, the first set of telecommunication service metrics includes a usage metric associated with an amount of usage of telecommunication services by the first user.

According to some embodiments, a device is provided. The device includes a processor coupled to memory, the processor configured to execute instructions to perform operations. The operations include determining a plurality of sets of telecommunication service metrics associated with a plurality of users of a telecommunication service provider, wherein a first set of telecommunication service metrics of the plurality of sets of telecommunication service metrics is associated with a first user of the plurality of users; segmenting the plurality of users into a plurality of user segments based upon the plurality of sets of telecommunication service metrics, wherein a first user segment of the plurality of user segments includes the first user; training a machine learning model using telecommunication service information associated with users of the first user segment to generate a trained machine learning model; determining, using the trained machine learning model, a forecast of telecommunication service usage associated with the first user segment, wherein the forecast is indicative of ranges of a telecommunication service usage metric associated with a plurality of periods of time; determining that a second user belongs to the first user segment; comparing a first telecommunication service usage metric, associated with the second user, with a first range of the ranges indicated by the forecast, wherein the first range is associated with a first period of time of the plurality of periods of time and wherein the first telecommunication service usage metric is based upon telecommunication service usage of the second user during the first period of time; and flagging the second user as having anomalous behavior based upon a determination that one or more telecommunication service usage metrics associated with the second user, including the first telecommunication service usage metric, are outside one or more ranges, including the first range, of the ranges indicated by the forecast.

Figure 3:
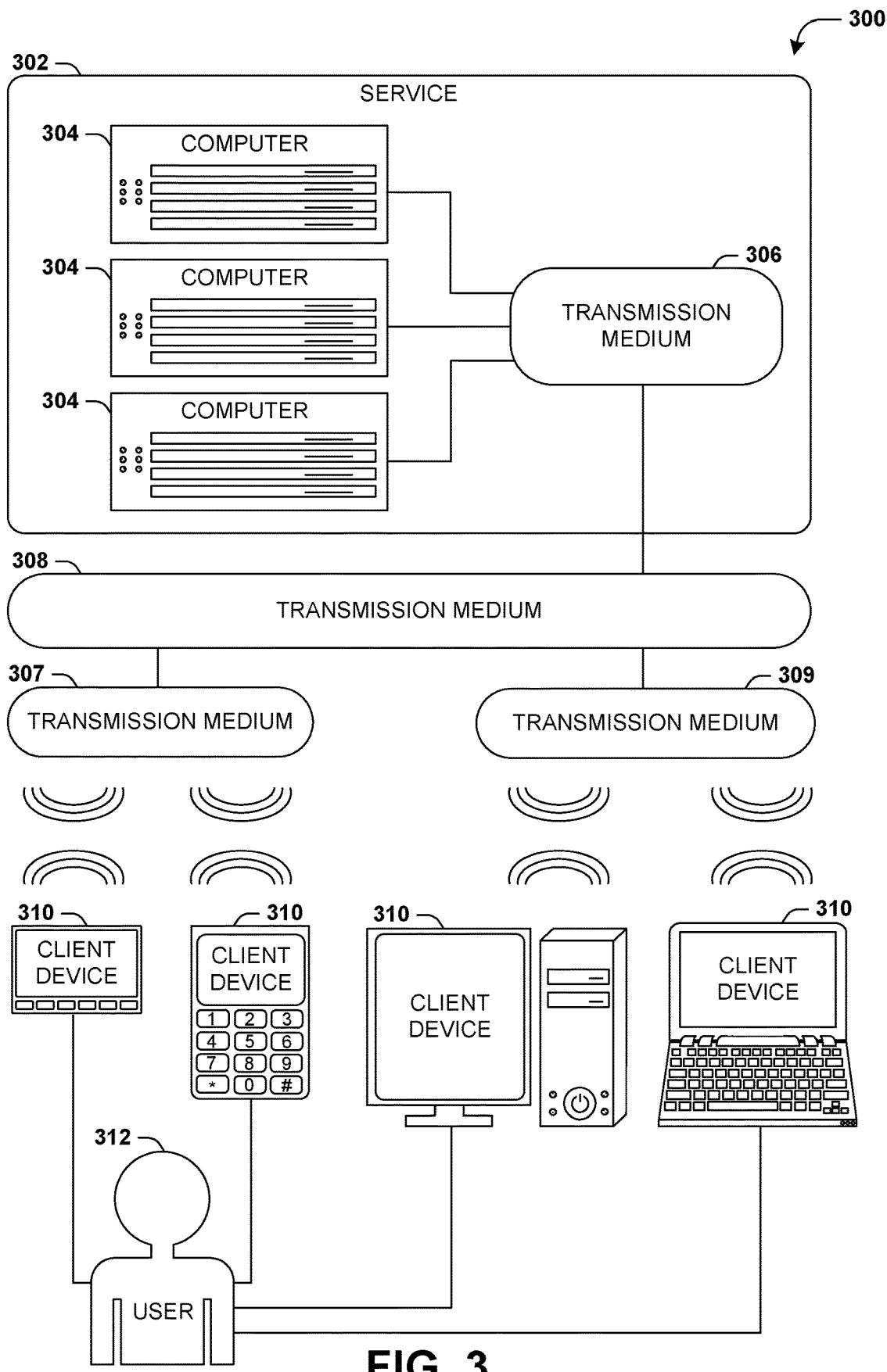
FIG. 3 is an illustration of a scenario involving various examples of transmission mediums that may be used to communicatively couple computers and clients.

FIG. 3 is an interaction diagram of a scenario 300 illustrating a service 302 provided by a set of computers 304 to a set of client devices 310 (e.g., UEs) via various types of transmission mediums. The computers 304 and/or client devices 310 may be capable of transmitting, receiving, processing, and/or storing many types of signals, such as in memory as physical memory states.

The computers 304 of the service 302 may be communicatively coupled together, such as for exchange of communications using a transmission medium 306. The transmission medium 306 may be organized according to one or more network architectures, such as computer/client, peer-to-peer, and/or mesh architectures, and/or a variety of roles, such as administrative computers, authentication computers, security monitor computers, data stores for objects such as files and databases, business logic computers, time synchronization computers, and/or front-end computers providing a user-facing interface for the service 302.

Likewise, the transmission medium 306 may comprise one or more sub-networks, such as may employ different architectures, may be compliant or compatible with differing protocols and/or may interoperate within the transmission medium 306. Additionally, various types of transmission medium 306 may be interconnected (e.g., a router may provide a link between otherwise separate and independent transmission medium 306).

In scenario 300 of FIG. 3, the transmission medium 306 of the service 302 is connected to a transmission medium 308 that allows the service 302 to exchange data with other services 302 and/or client devices 310. The transmission medium 308 may encompass various combinations of devices with varying levels of distribution and exposure, such as a public wide-area network and/or a private network (e.g., a virtual private network (VPN) of a distributed enterprise).

In the scenario 300 of FIG. 3, the service 302 may be accessed via the transmission medium 308 by a user 312 of one or more client devices 310, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 310 may communicate with the service 302 via various communicative couplings to the transmission medium 308. As a first such example, one or more client devices 310 may comprise a cellular communicator and may communicate with the service 302 by connecting to the transmission medium 308 via a transmission medium 307 provided by a cellular provider. As a second such example, one or more client devices 310 may communicate with the service 302 by connecting to the transmission medium 308 via a transmission medium 309 provided by a location such as the user's home or workplace (e.g., a WiFi (Institute of Electrical and Electronics Engineers (IEEE) Standard 802.11) network or a Bluetooth (IEEE Standard 802.15.1) personal area network). In this manner, the computers 304 and the client devices 310 may communicate over various types of transmission mediums.

Figure 4:
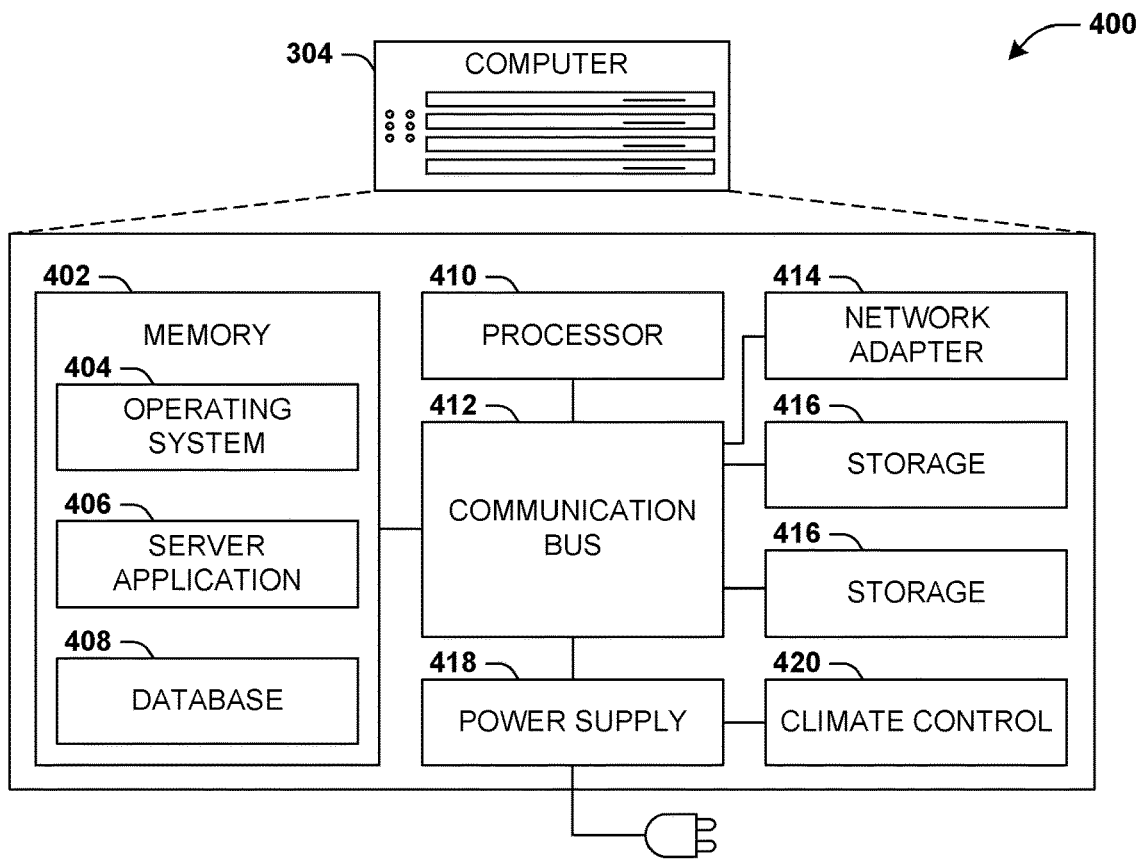
FIG. 4 is an illustration of a scenario involving an example configuration of a computer that may utilize and/or implement at least a portion of the techniques presented herein.

FIG. 4 presents a schematic architecture diagram 400 of a computer 304 that may utilize at least a portion of the techniques provided herein. Such a computer 304 may vary widely in configuration or capabilities, alone or in conjunction with other computers, in order to provide a service such as the service 302.

The computer 304 may comprise one or more processors 410 that process instructions. The one or more processors 410 may optionally include a plurality of cores; one or more coprocessors, such as a mathematics coprocessor or an integrated graphical processing unit (GPU); and/or one or more layers of local cache memory. The computer 304 may comprise memory 402 storing various forms of applications, such as an operating system 404; one or more computer applications 406; and/or various forms of data, such as a database 408 or a file system. The computer 304 may comprise a variety of peripheral components, such as a wired and/or wireless network adapter 414 connectible to a local area network and/or wide area network; one or more storage components 416, such as a hard disk drive, a solid-state storage device (SSD), a flash memory device, and/or a magnetic and/or optical disk reader.

The computer 304 may comprise a mainboard featuring one or more communication buses 412 that interconnect the processor 410, the memory 402, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 412 may interconnect the computer 304 with at least one other computer. Other components that may optionally be included with the computer 304 (though not shown in the schematic architecture diagram 400 of FIG. 4) include a display; a display adapter, such as a graphical processing unit (GPU); input peripherals, such as a keyboard and/or mouse; and a flash memory device that may store a basic input/output system (BIOS) routine that facilitates booting the computer 304 to a state of readiness.

The computer 304 may operate in various physical enclosures, such as a desktop or tower, and/or may be integrated with a display as an "all-in-one" device. The computer 304 may be mounted horizontally and/or in a cabinet or rack, and/or may simply comprise an interconnected set of components. The computer 304 may comprise a dedicated and/or shared power supply 418 that supplies and/or regulates power for the other components. The computer 304 may provide power to and/or receive power from another computer and/or other devices. The computer 304 may comprise a shared and/or dedicated climate control unit 420 that regulates climate properties, such as temperature, humidity, and/or airflow. Many such computers 304 may be configured and/or adapted to utilize at least a portion of the techniques presented herein.

Figure 5:
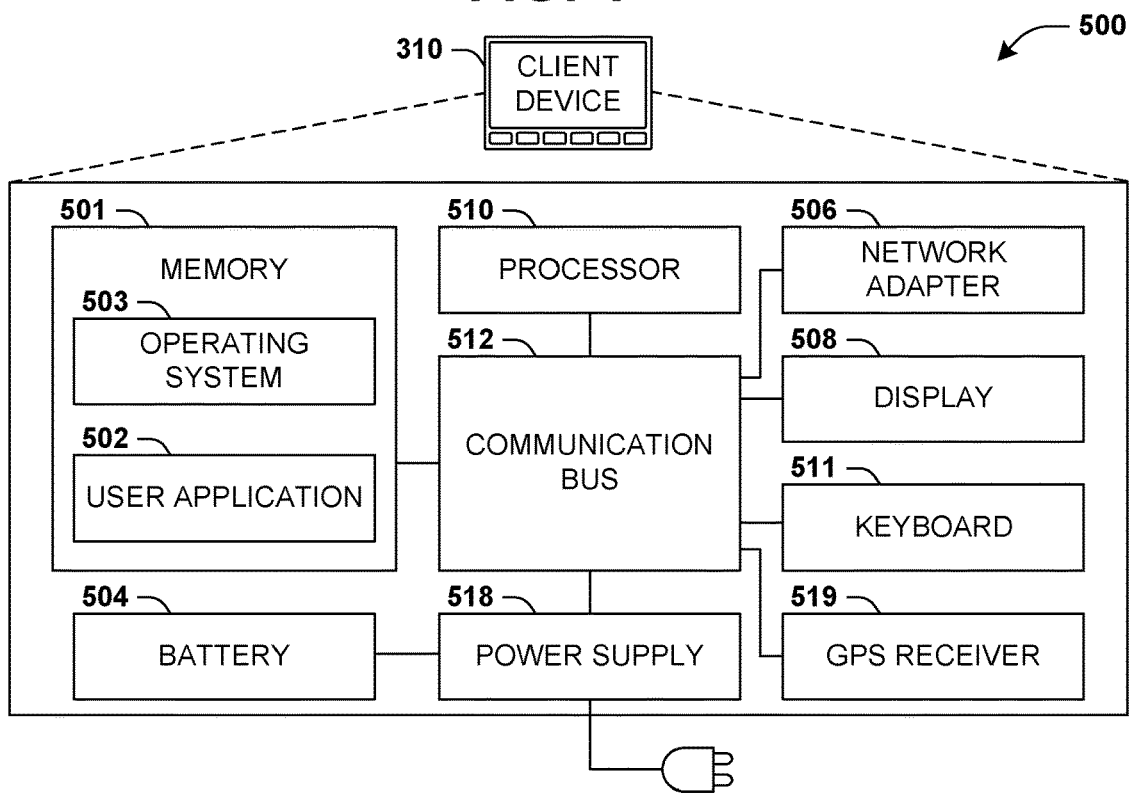
FIG. 5 is an illustration of a scenario involving an example configuration of a client that may utilize and/or implement at least a portion of the techniques presented herein.

FIG. 5 presents a schematic architecture diagram 500 of a client device 310 whereupon at least a portion of the techniques presented herein may be implemented. Such a client device 310 may vary widely in configuration or capabilities, in order to provide a variety of functionality to a user such as the user 312. The client device 310 may be provided in a variety of form factors, such as a desktop or tower workstation; an "all-in-one" device integrated with a display 508; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 310 may serve the user in a variety of roles, such as a workstation, kiosk, media player, gaming device, and/or appliance.

The client device 310 may comprise one or more processors 510 that process instructions. The one or more processors 510 may optionally include a plurality of cores; one or more coprocessors, such as a mathematics coprocessor or an integrated graphical processing unit (GPU); and/or one or more layers of local cache memory. The client device 310 may comprise memory 501 storing various forms of applications, such as an operating system 503; one or more user applications 502, such as document applications, media applications, file and/or data access applications, communication applications such as web browsers and/or email clients, utilities, and/or games; and/or drivers for various peripherals. The client device 310 may comprise a variety of peripheral components, such as a wired and/or wireless network adapter 506 connectible to a local area network and/or wide area network; one or more output components, such as a display 508 coupled with a display adapter (optionally including a graphical processing unit (GPU)), a sound adapter coupled with a speaker, and/or a printer; input devices for receiving input from the user, such as a keyboard 511, a mouse, a microphone, a camera, and/or a touch-sensitive component of the display 508; and/or environmental sensors, such as a global positioning system (GPS) receiver 519 that detects the location, velocity, and/or acceleration of the client device 310, a compass, accelerometer, and/or gyroscope that detects a physical orientation of the client device 310. Other components that may optionally be included with the client device 310 (though not shown in the schematic architecture diagram 500 of FIG. 5) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 310 to a state of readiness; and a climate control unit that regulates climate properties, such as temperature, humidity, and airflow.

The client device 310 may comprise a mainboard featuring one or more communication buses 512 that interconnect the processor 510, the memory 501, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 310 may comprise a dedicated and/or shared power supply 518 that supplies and/or regulates power for other components, and/or a battery 504 that stores power for use while the client device 310 is not connected to a power source via the power supply 518. The client device 310 may provide power to and/or receive power from other client devices.

Figure 6:
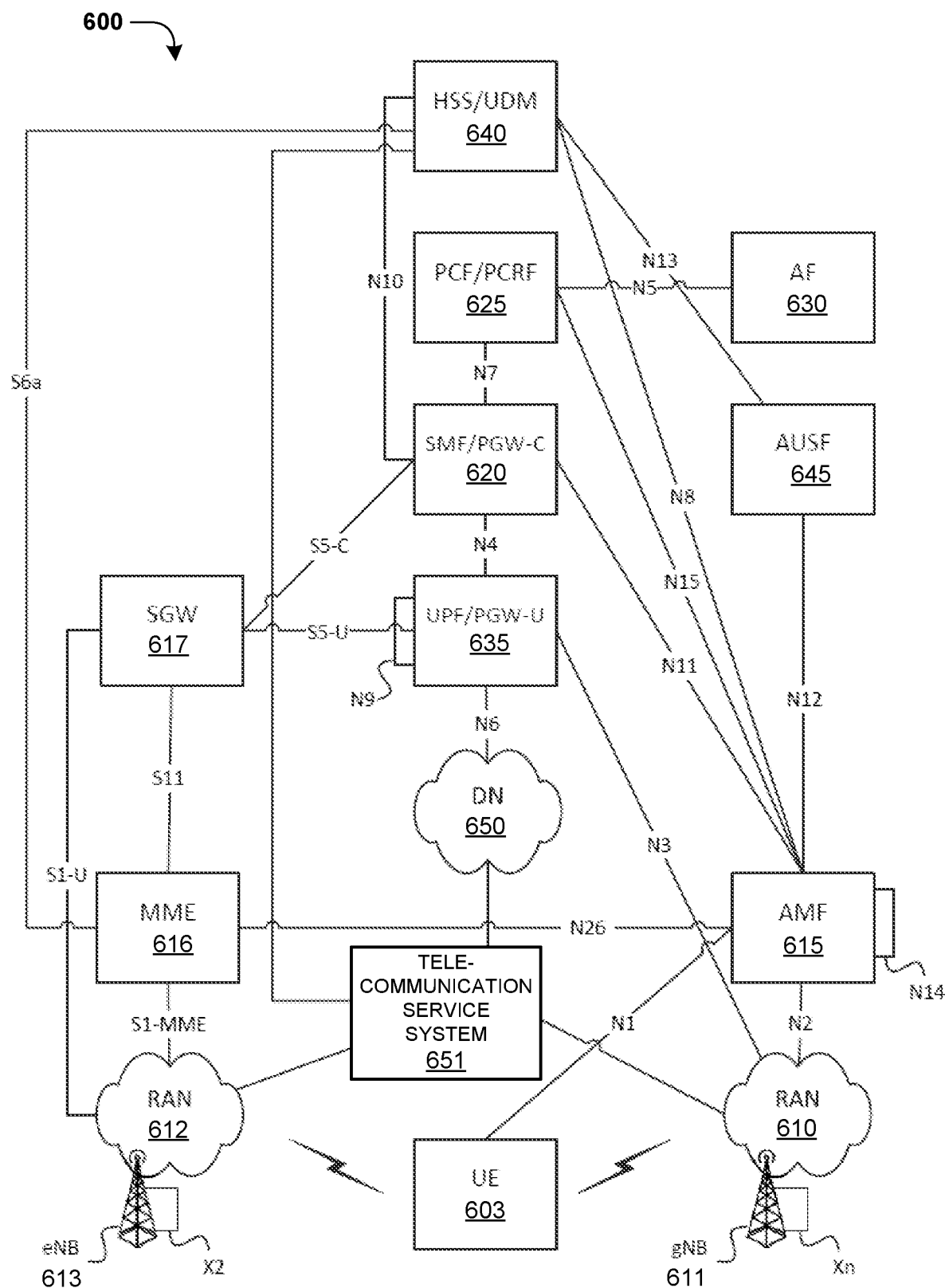
FIG. 6 is an illustration of an example environment in which at least a portion of the techniques presented herein may be utilized and/or implemented.

FIG. 6 illustrates an example environment 600, in which one or more embodiments may be implemented. In some embodiments, environment 600 may correspond to a Fifth Generation ("5G") network, and/or may include elements of a 5G network. In some embodiments, environment 600 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 600 may include UE 603, RAN 610 (which may include one or more Next Generation Node Bs ("gNBs") 611), RAN 612 (which may include one or more one or more evolved Node Bs ("eNBs") 613), and various network functions such as Access and Mobility Management Function ("AMF") 615, Mobility Management Entity ("MME") 616, Serving Gateway ("SGW") 617, Session Management Function ("SMF")/Packet Data Network ("PDN") Gateway ("PGW")-Control plane function ("PGW-C") 620, Policy Control Function ("PCF")/Policy Charging and Rules Function ("PCRF") 625, Application Function ("AF") 630, User Plane Function ("UPF")/PGW-User plane function ("PGW-U") 635, Home Subscriber Server ("HSS")/Unified Data Management ("UDM") 640, and Authentication Server Function ("AUSF") 645. Environment 600 may also include one or more networks, such as Data Network ("DN") 650. Environment 600 may include one or more additional devices or systems communicatively coupled to one or more networks (e.g., DN 650), such as telecommunication service system 651.

The example shown in FIG. 6 illustrates one instance of each network component or function (e.g., one instance of SMF/PGW-C 620, PCF/PCRF 625, UPF/PGW-U 635, HSS/UDM 640, and/or 645). In practice, environment 600 may include multiple instances of such components or functions. For example, in some embodiments, environment 600 may include multiple "slices" of a core network, where each slice includes a discrete set of network functions (e.g., one slice may include a first instance of SMF/PGW-C 620, PCF/PCRF 625, UPF/PGW-U 635, HSS/UDM 640, and/or 645, while another slice may include a second instance of SMF/PGW-C 620, PCF/PCRF 625, UPF/PGW-U 635, HSS/UDM 640, and/or 645). The different slices may provide differentiated levels of service, such as service in accordance with different Quality of Service ("QoS") parameters.

The quantity of devices and/or networks, illustrated in FIG. 6, is provided for explanatory purposes only. In practice, environment 600 may include additional devices and/or networks, fewer devices and/or networks, different devices and/or networks, or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively and/or additionally, one or more of the devices of environment 600 may perform one or more network functions described as being performed by another one or more of the devices of environment 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

UE 603 may include a computation and communication device, such as a wireless mobile communication device that is capable of communicating with RAN 610, RAN 612, and/or DN 650. UE 603 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 603 may send traffic to and/or receive traffic (e.g., user plane traffic) from DN 650 via RAN 610, RAN 612, and/or UPF/PGW-U 635.

RAN 610 may be, or may include, a 5G RAN that includes one or more base stations (e.g., one or more gNBs 611), via which UE 603 may communicate with one or more other elements of environment 600. UE 603 may communicate with RAN 610 via an air interface (e.g., as provided by gNB 611). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, AMF 615, and/or one or more other devices or networks) and may communicate the traffic to UE 603 via the air interface.

RAN 612 may be, or may include, a LTE RAN that includes one or more base stations (e.g., one or more eNBs 613), via which UE 603 may communicate with one or more other elements of environment 600. UE 603 may communicate with RAN 612 via an air interface (e.g., as provided by eNB 613). For instance, RAN 610 may receive traffic (e.g., voice call traffic, data traffic, messaging traffic, signaling traffic, etc.) from UE 603 via the air interface, and may communicate the traffic to UPF/PGW-U 635, and/or one or more other devices or networks. Similarly, RAN 610 may receive traffic intended for UE 603 (e.g., from UPF/PGW-U 635, SGW 617, and/or one or more other devices or networks) and may communicate the traffic to UE 603 via the air interface.

AMF 615 may include one or more devices, systems, Virtualized Network Functions ("VNFs"), etc., that perform operations to register UE 603 with the 5G network, to establish bearer channels associated with a session with UE 603, to hand off UE 603 from the 5G network to another network, to hand off UE 603 from the other network to the 5G network, manage mobility of UE 603 between RANs 610 and/or gNBs 611, and/or to perform other operations. In some embodiments, the 5G network may include multiple AMFs 615, which communicate with each other via the N14 interface (denoted in FIG. 6 by the line marked "N14" originating and terminating at AMF 615).

MME 616 may include one or more devices, systems, VNFs, etc., that perform operations to register UE 603 with the EPC, to establish bearer channels associated with a session with UE 603, to hand off UE 603 from the EPC to another network, to hand off UE 603 from another network to the EPC, manage mobility of UE 603 between RANs 612 and/or eNBs 613, and/or to perform other operations.

SGW 617 may include one or more devices, systems, VNFs, etc., that aggregate traffic received from one or more eNBs 613 and send the aggregated traffic to an external network or device via UPF/PGW-U 635. Additionally, SGW 617 may aggregate traffic received from one or more UPF/PGW-Us 635 and may send the aggregated traffic to one or more eNBs 613. SGW 617 may operate as an anchor for the user plane during inter-eNB handovers and as an anchor for mobility between different telecommunication networks or RANs (e.g., RANs 610 and 612).

SMF/PGW-C 620 may include one or more devices, systems, VNFs, etc., that gather, process, store, and/or provide information in a manner described herein. SMF/PGW-C 620 may, for example, facilitate in the establishment of communication sessions on behalf of UE 603. In some embodiments, the establishment of communications sessions may be performed in accordance with one or more policies provided by PCF/PCRF 625.

PCF/PCRF 625 may include one or more devices, systems, VNFs, etc., that aggregate information to and from the 5G network and/or other sources. PCF/PCRF 625 may receive information regarding policies and/or subscriptions from one or more sources, such as subscriber databases and/or from one or more users (such as, for example, an administrator associated with PCF/PCRF 625).

AF 630 may include one or more devices, systems, VNFs, etc., that receive, store, and/or provide information that may be used in determining parameters (e.g., quality of service parameters, charging parameters, or the like) for certain applications.

UPF/PGW-U 635 may include one or more devices, systems, VNFs, etc., that receive, store, and/or provide data (e.g., user plane data). For example, UPF/PGW-U 635 may receive user plane data (e.g., voice call traffic, data traffic, etc.), destined for UE 603, from DN 650, and may forward the user plane data toward UE 603 (e.g., via RAN 610, SMF/PGW-C 620, and/or one or more other devices). In some embodiments, multiple UPFs 635 may be deployed (e.g., in different geographical locations), and the delivery of content to UE 603 may be coordinated via the N9 interface (e.g., as denoted in FIG. 6 by the line marked "N9" originating and terminating at UPF/PGW-U 635). Similarly, UPF/PGW-U 635 may receive traffic from UE 603 (e.g., via RAN 610, SMF/PGW-C 620, and/or one or more other devices), and may forward the traffic toward DN 650. In some embodiments, UPF/PGW-U 635 may communicate (e.g., via the N4 interface) with SMF/PGW-C 620, regarding user plane data processed by UPF/PGW-U 635.

HSS/UDM 640 and AUSF 645 may include one or more devices, systems, VNFs, etc., that manage, update, and/or store, in one or more memory devices associated with AUSF 645 and/or HSS/UDM 640, profile information associated with a subscriber. AUSF 645 and/or HSS/UDM 640 may perform authentication, authorization, and/or accounting operations associated with the subscriber and/or a communication session with UE 603.

DN 650 may include one or more wired and/or wireless networks. For example, DN 650 may include an Internet Protocol ("IP")-based PDN, a wide area network ("WAN") such as the Internet, a private enterprise network, and/or one or more other networks. UE 603 may communicate, through DN 650, with data servers, other UEs UE 603, and/or to other servers or applications that are coupled to DN 650. DN 650 may be connected to one or more other networks, such as a public switched telephone network ("PSTN"), a public land mobile network ("PLMN"), and/or another network. DN 650 may be connected to one or more devices, such as content providers, applications, web servers, and/or other devices, with which UE 603 may communicate.

The telecommunication service system 651 may include one or more devices, systems, VNFs, etc., that perform one or more operations described herein. For example, the telecommunication service system 651 may determine telecommunication service metrics associated with users, segment the users into user segments based upon the telecommunication service metrics, train machine learning models based upon information associated with the user segments to generate trained machine learning models, determine forecasts of telecommunication service usage associated with the user segments using the trained machine learning models, and/or flag users as having anomalous behavior based upon the forecasts. Alternatively and/or additionally, the telecommunication service system 651 may authenticate a user in response to flagging the user as having anomalous behavior. Alternatively and/or additionally, the telecommunication service system 651 may deactivate telecommunication service of a UE associated with a user in response to flagging the user as having anomalous behavior (and/or in response to determining that the user is associated with fraudulent activity). Alternatively and/or additionally, the telecommunication service system 651 may determine a compensation value associated with a user (and/or check whether a second compensation value is incorrect) in response to flagging the user as having anomalous behavior. Alternatively and/or additionally, the telecommunication service system 651 may perform telecommunication resource allocation based upon the user segments.

Figure 7:
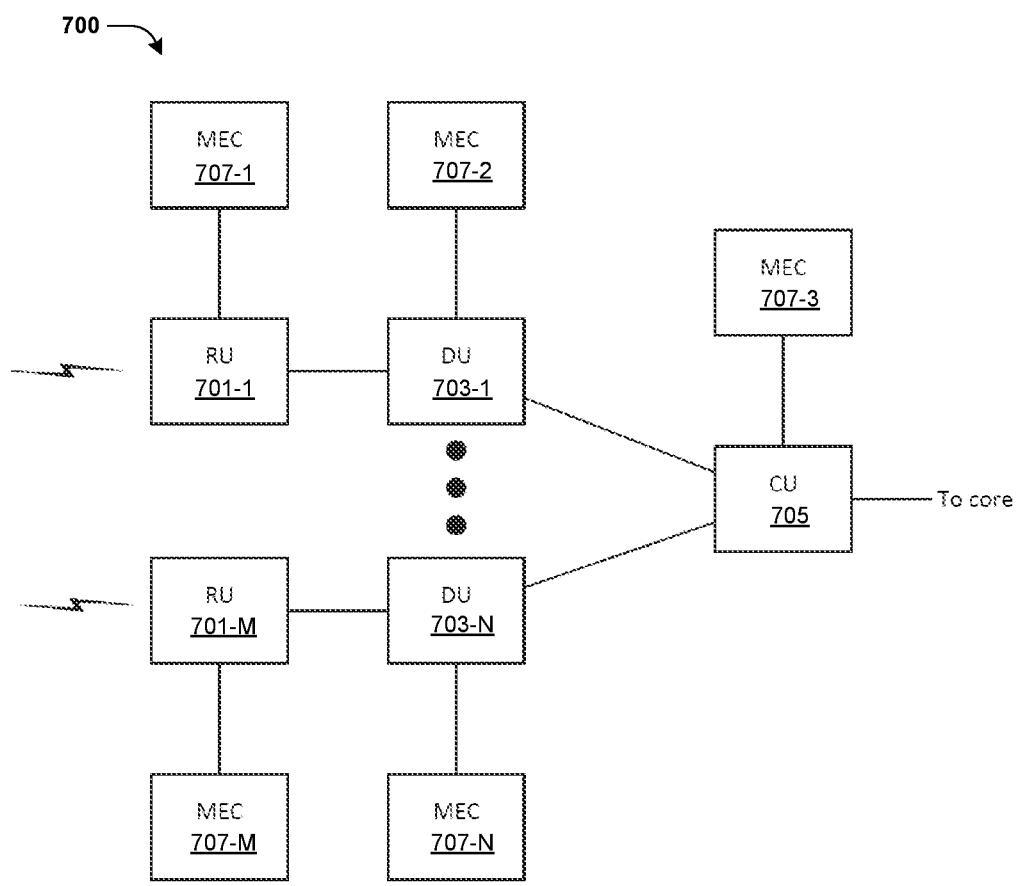
FIG. 7 is an illustration of an example network that may utilize and/or implement at least a portion of the techniques presented herein.

FIG. 7 illustrates an example Distributed Unit ("DU") network 700, which may be included in and/or implemented by one or more RANs (e.g., RAN 610, RAN 612, or some other RAN). In some embodiments, a particular RAN may include one DU network 700. In some embodiments, a particular RAN may include multiple DU networks 700. In some embodiments, DU network 700 may correspond to a particular gNB 611 of a 5G RAN (e.g., RAN 610). In some embodiments, DU network 700 may correspond to multiple gNBs 611. In some embodiments, DU network 700 may correspond to one or more other types of base stations of one or more other types of RANs. As shown, DU network 700 may include Central Unit ("CU") 705, one or more Distributed Units ("DUs") 703-1 through 703-N (referred to individually as "DU 703," or collectively as "DUs 703"), and one or more Radio Units ("RUs") 701-1 through 701-M (referred to individually as "RU 701," or collectively as "RUs 701").

CU 705 may communicate with a core of a wireless network (e.g., may communicate with one or more of the devices or systems described above with respect to FIG. 6, such as AMF 615 and/or UPF/PGW-U 635). In the uplink direction (e.g., for traffic from UEs UE 603 to a core network), CU 705 may aggregate traffic from DUs 703, and forward the aggregated traffic to the core network. In some embodiments, CU 705 may receive traffic according to a given protocol (e.g., Radio Link Control ("RLC")) from DUs 703, and may perform higher-layer processing (e.g., may aggregate/process RLC packets and generate Packet Data Convergence Protocol ("PDCP") packets based upon the RLC packets) on the traffic received from DUs 703.

In accordance with some embodiments, CU 705 may receive downlink traffic (e.g., traffic from the core network) for a particular UE 603, and may determine which DU(s) 703 should receive the downlink traffic. DU 703 may include one or more devices that transmit traffic between a core network (e.g., via CU 705) and UE 603 (e.g., via a respective RU 701). DU 703 may, for example, receive traffic from RU 701 at a first layer (e.g., physical ("PHY") layer traffic, or lower PHY layer traffic), and may process/aggregate the traffic to a second layer (e.g., upper PHY and/or RLC). DU 703 may receive traffic from CU 705 at the second layer, may process the traffic to the first layer, and provide the processed traffic to a respective RU 701 for transmission to UE 603.

RU 701 may include hardware circuitry (e.g., one or more RF transceivers, antennas, radios, and/or other suitable hardware) to communicate wirelessly (e.g., via an RF interface) with one or more UEs UE 603, one or more other DUs 703 (e.g., via RUs 701 associated with DUs 703), and/or any other suitable type of device. In the uplink direction, RU 701 may receive traffic from UE 603 and/or another DU 703 via the RF interface and may provide the traffic to DU 703. In the downlink direction, RU 701 may receive traffic from DU 703, and may provide the traffic to UE 603 and/or another DU 703.

RUs 701 may, in some embodiments, be communicatively coupled to one or more Multi-Access/Mobile Edge Computing ("MEC") devices, referred to sometimes herein simply as ("MECs") 707. For example, RU 701-1 may be communicatively coupled to MEC 707-1, RU 701-M may be communicatively coupled to MEC 707-M, DU 703-1 may be communicatively coupled to MEC 707-2, DU 703-N may be communicatively coupled to MEC 707-N, CU 705 may be communicatively coupled to MEC 707-3, and so on. MECs 707 may include hardware resources (e.g., configurable or provisionable hardware resources) that may be configured to provide services and/or otherwise process traffic to and/or from UE 603, via a respective RU 701.

For example, RU 701-1 may route some traffic, from UE 603, to MEC 707-1 instead of to a core network (e.g., via DU 703 and CU 705). MEC 707-1 may process the traffic, perform one or more computations based upon the received traffic, and may provide traffic to UE 603 via RU 701-1. In this manner, ultra-low latency services may be provided to UE 603, as traffic does not need to traverse DU 703, CU 705, and an intervening backhaul network between DU network 700 and the core network. In some embodiments, MEC 707 may include, and/or may implement some or all of the functionality described above with respect to at least one of the telecommunication service system 651, the one or more first UEs associated with the first user, the one or more second UEs associated with the second user, etc.

Figure 8:
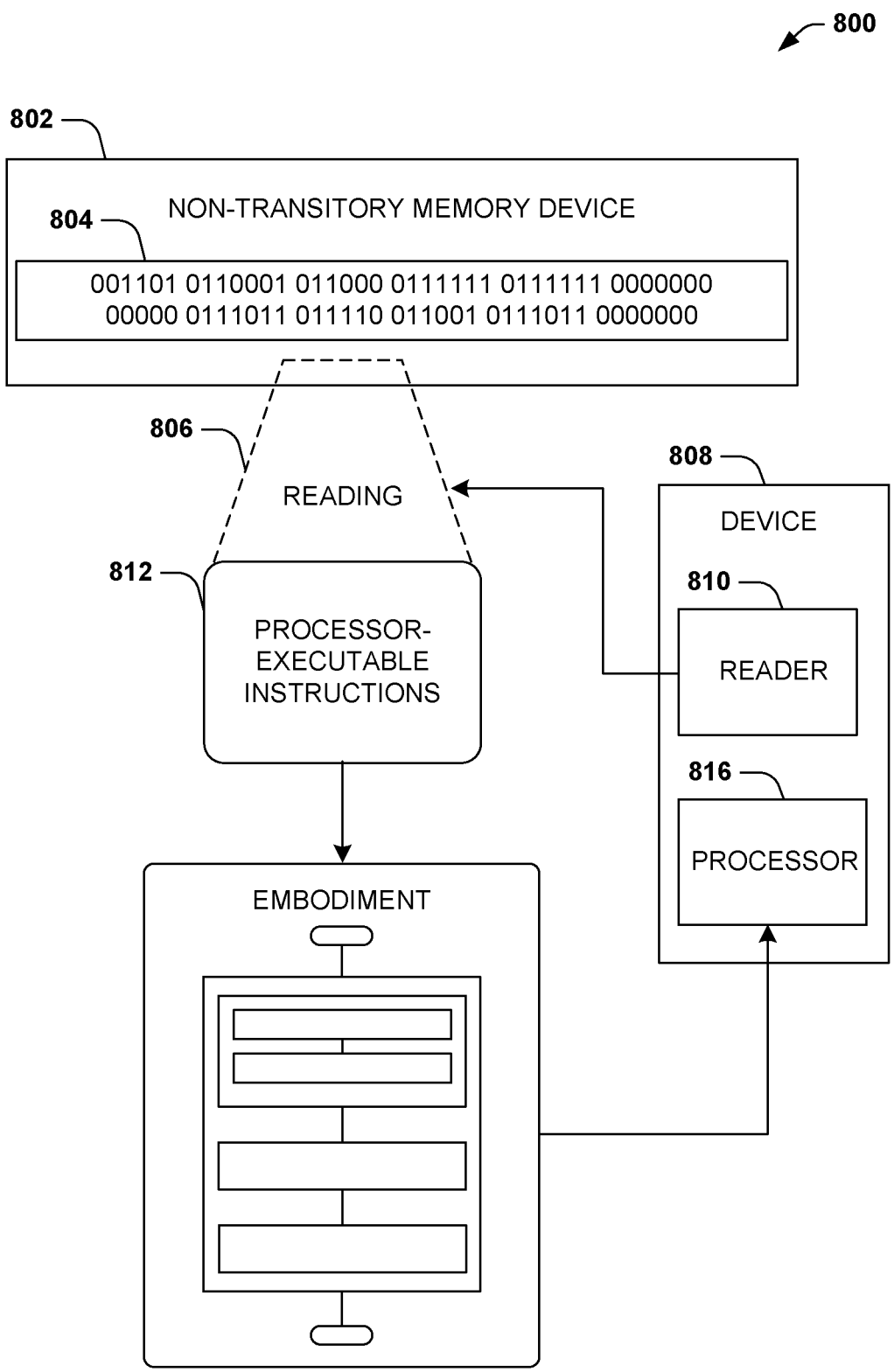
FIG. 8 is an illustration of a scenario featuring an example non-transitory machine readable medium in accordance with one or more of the provisions set forth herein.

FIG. 8 is an illustration of a scenario 800 involving an example non-transitory machine readable medium 802. The non-transitory machine readable medium 802 may comprise processor-executable instructions 812 that when executed by a processor 816 cause performance (e.g., by the processor 816) of at least some of the provisions herein. The non-transitory machine readable medium 802 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 802 stores computer-readable data 804 that, when subjected to reading 806 by a reader 810 of a device 808 (e.g., a read head of a hard disk drive, or a read operation invoked on a solid-state storage device), express the processor-executable instructions 812. In some embodiments, the processor-executable instructions 812, when executed cause performance of operations, such as at least some of the example method 200 of FIG. 2, for example. In some embodiments, the processor-executable instructions 812 are configured to cause implementation of a system, such as at least some of the example system 101 of FIGS. 1A-1G, for example.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
    determining a plurality of sets of telecommunication service metrics associated with a plurality of users of a telecommunication service provider, wherein a first set of telecommunication service metrics of the plurality of sets of telecommunication service metrics is associated with a first user of the plurality of users, wherein the first set of telecommunication service metrics comprises a frequency metric associated with a quantity of user equipments (UEs) of the first user;
    segmenting the plurality of users into a plurality of user segments based upon the plurality of sets of telecommunication service metrics, wherein a first user segment of the plurality of user segments comprises the first user;
    training a machine learning model using telecommunication service information associated with users of the first user segment to generate a trained machine learning model;
    determining, using the trained machine learning model, a forecast of telecommunication service usage associated with the first user segment, wherein the forecast is indicative of ranges of a telecommunication service usage metric associated with a plurality of periods of time;

determining that a second user belongs to the first user segment;

comparing a first telecommunication service usage metric, associated with the second user, with a first range of the ranges indicated by the forecast, wherein:

the first range is associated with a first period of time of the plurality of periods of time; and the first telecommunication service usage metric is based upon telecommunication service usage of the second user during the first period of time; and flagging the second user as having anomalous behavior based upon a determination that one or more telecommunication service usage metrics associated with the second user, comprising the first telecommunication service usage metric, are outside one or more ranges, comprising the first range, of the ranges indicated by the forecast.

2. The method of claim 1, comprising:

in response to flagging the second user as having anomalous behavior, presenting, via a UE associated with the second user, an authentication interface;

receiving authentication information associated with the second user via the authentication interface; and authenticating the second user based upon the authentication information.

3. The method of claim 1, comprising:

in response to flagging the second user as having anomalous behavior, deactivating telecommunication service of a UE associated with the second user.

4. The method of claim 1, comprising:

in response to flagging the second user as having anomalous behavior, determining a first compensation value corresponding to an amount of compensation for services of the telecommunication service provider for the second user over a second period of time.

5. The method of claim 4, comprising:

comparing the first compensation value with a second compensation value determined, in association with the second user, prior to flagging the second user as having anomalous behavior;

in response to determining that the second compensation value is different than the first compensation value, generating a bill based upon the first compensation value; and transmitting the bill to a UE associated with the second user.

6. The method of claim 1, comprising:

determining a plurality of UE locations of UEs associated with a second plurality of users of the telecommunication service provider;

determining one or more locations based upon:

the plurality of UE locations; and user segments, of the plurality of user segments, associated with the second plurality of users; and transmitting, to a telecommunication resource allocation device, instructions to allocate one or more telecommunication resources to the one or more locations.

7. The method of claim 1, wherein:

the first set of telecommunication service metrics comprises a recency metric associated with recency of usage of telecommunication services by the first user.

8. The method of claim 1, wherein:

the quantity of UEs of the first user corresponds to a quantity of UEs that are included in a telecommunication service plan of the first user with the telecommunication service provider.

9. The method of claim 1, wherein:

the first set of telecommunication service metrics comprises a usage metric associated with an amount of usage of telecommunication services by the first user.

10. The method of claim 1, wherein the first set of telecommunication service metrics comprises:

a recency metric associated with recency of usage of telecommunication services by the first user; and a usage metric associated with an amount of usage of telecommunication services by the first user.

11. A non-transitory computer-readable medium storing instructions that when executed perform operations comprising:

determining a plurality of sets of telecommunication service metrics associated with a plurality of users of a telecommunication service provider, wherein a first set of telecommunication service metrics of the plurality of sets of telecommunication service metrics is associated with a first user of the plurality of users;

segmenting the plurality of users into a plurality of user segments based upon the plurality of sets of telecommunication service metrics, wherein a first user segment of the plurality of user segments comprises the first user;

training a machine learning model using telecommunication service information associated with users of the first user segment to generate a trained machine learning model;

determining, using the trained machine learning model, a forecast of telecommunication service usage associated with the first user segment, wherein the forecast is indicative of ranges of a telecommunication service usage metric associated with a plurality of periods of time;

determining that a second user belongs to the first user segment;

comparing a first telecommunication service usage metric, associated with the second user, with a first range of the ranges indicated by the forecast, wherein:

the first range is associated with a first period of time of the plurality of periods of time; and the first telecommunication service usage metric is based upon telecommunication service usage of the second user during the first period of time;

flagging the second user as having anomalous behavior based upon a determination that one or more telecommunication service usage metrics associated with the second user, comprising the first telecommunication service usage metric, are outside one or more ranges, comprising the first range, of the ranges indicated by the forecast; and in response to flagging the second user as having anomalous behavior, determining a first compensation value corresponding to an amount of compensation for services of the telecommunication service provider for the second user over a second period of time.

12. The non-transitory computer-readable medium of claim 11, the operations comprising:

in response to flagging the second user as having anomalous behavior, presenting, via a user equipment (UE) associated with the second user, an authentication interface;

receiving authentication information associated with the second user via the authentication interface; and authenticating the second user based upon the authentication information.

13. The non-transitory computer-readable medium of claim 11, the operations comprising:

in response to flagging the second user as having anomalous behavior, deactivating telecommunication service of a user equipment (UE) associated with the second user.

14. The non-transitory computer-readable medium of claim 11, the operations comprising:
determining whether the first compensation value is correct.

15. The non-transitory computer-readable medium of claim 11, the operations comprising:
comparing the first compensation value with a second compensation value determined, in association with the second user, prior to flagging the second user as having anomalous behavior;
in response to determining that the second compensation value is different than the first compensation value, generating a bill based upon the first compensation value; and
transmitting the bill to a user equipment (UE) associated with the second user.

16. The non-transitory computer-readable medium of claim 11, the operations comprising:
determining a plurality of user equipment (UE) locations of UEs associated with a second plurality of users of the telecommunication service provider;
determining one or more locations based upon:
the plurality of UE locations; and
user segments, of the plurality of user segments, associated with the second plurality of users; and
transmitting, to a telecommunication resource allocation device, instructions to allocate one or more telecommunication resources to the one or more locations.

17. The non-transitory computer-readable medium of claim 11, wherein:
the first set of telecommunication service metrics comprises a recency metric associated with recency of usage of telecommunication services by the first user.

18. The non-transitory computer-readable medium of claim 11, wherein:
the first set of telecommunication service metrics comprises a frequency metric associated with a quantity of user equipments (UEs) of the first user.

19. The non-transitory computer-readable medium of claim 11, wherein:
the first set of telecommunication service metrics comprises a usage metric associated with an amount of usage of telecommunication services by the first user.

20. A device comprising:
a processor coupled to memory, the processor configured to execute instructions to perform operations comprising:
determining a plurality of sets of telecommunication service metrics associated with a plurality of users of a telecommunication service provider, wherein a first set of telecommunication service metrics of the plurality of sets of telecommunication service metrics is associated with a first user of the plurality of users;
segmenting the plurality of users into a plurality of user segments based upon the plurality of sets of telecommunication service metrics, wherein a first user segment of the plurality of user segments comprises the first user;
training a machine learning model using telecommunication service information associated with users of the first user segment to generate a trained machine learning model;
determining, using the trained machine learning model, a forecast of telecommunication service usage associated with the first user segment, wherein the forecast is indicative of ranges of a telecommunication service usage metric associated with a plurality of periods of time;
determining that a second user belongs to the first user segment;
comparing a first telecommunication service usage metric, associated with the second user, with a first range of the ranges indicated by the forecast, wherein:
the first range is associated with a first period of time of the plurality of periods of time; and
the first telecommunication service usage metric is based upon telecommunication service usage of the second user during the first period of time;
flagging the second user as having anomalous behavior based upon a determination that one or more telecommunication service usage metrics associated with the second user, comprising the first telecommunication service usage metric, are outside one or more ranges, comprising the first range, of the ranges indicated by the forecast;
determining a plurality of user equipment (UE) locations of UEs associated with a second plurality of users of the telecommunication service provider;
determining one or more locations based upon:
the plurality of UE locations; and
user segments, of the plurality of user segments, associated with the second plurality of users; and
transmitting, to a telecommunication resource allocation device, instructions to allocate one or more telecommunication resources to the one or more locations.

* * * * *